United States Patent
Schenker et al.

(10) Patent No.: US 11,155,965 B2
(45) Date of Patent: *Oct. 26, 2021

(54) PROCESS FOR THE PREPARATION OF FLOCCULATED FILLER PARTICLES

(71) Applicant: Omya International AG, Oftringen (CH)

(72) Inventors: Michel Schenker, Schönenwerd (CH); Matthias Buri, Rothrist (CH); Lars Andersson, Kilchberg (CH); Daniel Gantenbein, Basel (CH); Patrick A. C. Gane, Rothrist (CH)

(73) Assignee: OMYA INTERNATIONAL AG, Oftringen (CH)

( * ) Notice: Subject to any disclaimer, the term of this patent is extended or adjusted under 35 U.S.C. 154(b) by 42 days.

This patent is subject to a terminal disclaimer.

(21) Appl. No.: 15/520,251

(22) PCT Filed: Oct. 22, 2015

(86) PCT No.: PCT/EP2015/074472
§ 371 (c)(1),
(2) Date: Apr. 19, 2017

(87) PCT Pub. No.: WO2016/071117
PCT Pub. Date: May 12, 2016

(65) Prior Publication Data

US 2017/0335517 A1  Nov. 23, 2017

Related U.S. Application Data

(60) Provisional application No. 62/079,662, filed on Nov. 14, 2014.

(30) Foreign Application Priority Data

Nov. 7, 2014  (EP) .................................. 14192379

(51) Int. Cl.
| | |
|---|---|
| *D21H 17/67* | (2006.01) |
| *D21H 17/28* | (2006.01) |
| *D21H 17/25* | (2006.01) |
| *C09C 1/02* | (2006.01) |
| *C09C 1/40* | (2006.01) |
| *C01F 11/18* | (2006.01) |
| *C09C 1/00* | (2006.01) |
| *C09C 1/42* | (2006.01) |
| *C09C 3/04* | (2006.01) |
| *D21H 17/68* | (2006.01) |

(52) U.S. Cl.
CPC ......... *D21H 17/675* (2013.01); *C01F 11/185* (2013.01); *C09C 1/00* (2013.01); *C09C 1/021* (2013.01); *C09C 1/402* (2013.01); *C09C 1/42* (2013.01); *C09C 3/045* (2013.01); *D21H 17/25* (2013.01); *D21H 17/28* (2013.01); *D21H 17/67* (2013.01); *D21H 17/68* (2013.01); *C01P 2004/52* (2013.01); *C01P 2004/61* (2013.01); *C01P 2004/64* (2013.01); *C01P 2006/22* (2013.01)

(58) Field of Classification Search
None
See application file for complete search history.

(56) References Cited

U.S. PATENT DOCUMENTS

| | | | |
|---|---|---|---|
| 3,682,856 A | 8/1972 | Adams et al. | |
| 3,873,336 A | 3/1975 | Lambert et al. | |
| 5,332,433 A | 7/1994 | Story et al. | |
| 5,344,487 A | 9/1994 | Whalen-Shaw | |
| 5,708,162 A | 1/1998 | Hilbig et al. | |
| 8,080,595 B2 | 12/2011 | Gane et al. | |
| 8,343,312 B2 | 1/2013 | Mahr et al. | |
| 9,296,900 B2 | 3/2016 | Munchow | |
| 10,053,817 B2* | 8/2018 | Gane .................... | D21H 17/675 |
| 2006/0183549 A1 | 8/2006 | Chow et al. | |
| 2007/0240619 A1 | 10/2007 | Münchow | |
| 2007/0266898 A1 | 11/2007 | Gane et al. | |
| 2008/0210394 A1 | 9/2008 | Mahr et al. | |
| 2009/0065162 A1* | 3/2009 | Cheng .................... | D21H 17/67 |
| | | | 162/164.3 |
| 2010/0120948 A1 | 5/2010 | Gane et al. | |
| 2012/0016061 A1 | 1/2012 | Gane et al. | |
| 2012/0031576 A1 | 2/2012 | Gane et al. | |
| 2013/0059949 A1 | 3/2013 | Cheng et al. | |
| 2015/0083026 A1 | 3/2015 | Gantenbein et al. | |
| 2015/0141547 A1 | 5/2015 | Gane et al. | |
| 2015/0197892 A1* | 7/2015 | Hirvikoski ........... | D21H 17/675 |
| | | | 162/72 |

FOREIGN PATENT DOCUMENTS

| | | |
|---|---|---|
| CA | 2037525 | 9/1991 |
| CA | 2636474 | 11/2015 |
| CN | 101535569 | 9/2009 |
| DE | 1543116 A1 | 7/1969 |
| DE | 4411681 A1 | 10/1995 |
| (Continued) | | |

OTHER PUBLICATIONS

The International Search Report dated Jan. 19, 2016 for PCT/EP2015/074472.
The Written Opinion of the International Searching Authority dated Jan. 19, 2016 for PCT/EP2015/074472.
(Continued)

*Primary Examiner* — Sheng H Davis
(74) *Attorney, Agent, or Firm* — Heslin Rothenberg Farley & Mesiti P.C.

(57) ABSTRACT

The present invention concerns a process for the preparation of flocculated filler particles, wherein at least two aqueous suspensions of at least one filler material and at least one flocculating additive are combined.

32 Claims, 5 Drawing Sheets

(56) References Cited

FOREIGN PATENT DOCUMENTS

| | | | |
|---|---|---|---|
| EP | 1637501 | | 3/2006 |
| EP | 2070991 | A1 | 6/2009 |
| EP | 2264108 | A1 | 12/2010 |
| EP | 2264109 | A1 | 12/2010 |
| EP | 2662416 | * | 5/2012 |
| EP | 2505614 | A1 | 10/2012 |
| EP | 2505615 | A1 | 10/2012 |
| EP | 2565236 | A1 | 3/2013 |
| EP | 2565237 | A1 | 3/2013 |
| EP | 2662416 | A1 | 11/2013 |
| EP | 2662417 | A1 | 11/2013 |
| EP | 2662419 | A1 | 11/2013 |
| JP | 6461588 | A | 3/1989 |
| JP | S6461588 | | 3/1989 |
| RU | 2350637 | | 3/2009 |
| WO | 9516003 | | 6/1995 |
| WO | 03087472 | A1 | 10/2003 |
| WO | 2006008657 | A2 | 1/2006 |
| WO | 2006128814 | A1 | 12/2006 |
| WO | 2008139292 | A1 | 11/2008 |
| WO | 2009036271 | A1 | 3/2009 |
| WO | WO2009036271 | * | 3/2009 |
| WO | 2009074492 | A1 | 6/2009 |
| WO | 2010126712 | A1 | 11/2010 |
| WO | 2011019811 | A1 | 2/2011 |
| WO | 2013107933 | A1 | 7/2013 |
| WO | 2013158811 | A1 | 10/2013 |
| WO | 2014070488 | A1 | 5/2014 |

OTHER PUBLICATIONS

International Search Report for PCT/EP2015/075614 (dated Dec. 9, 2015).
Written Opinion of the International Searching Authority for PCT/EP2015/075614 (dated Dec. 9, 2015).

* cited by examiner

PROCESS FOR THE PREPARATION OF FLOCCULATED FILLER PARTICLES

CROSS-REFERENCE TO RELATED APPLICATIONS

This is a U.S. national phase of PCT Application No. PCT/EP2015/074472, filed Oct. 22, 2015, which claims priority to European Application No. 14192379.7, filed Nov. 7, 2014 and U.S. Provisional Application No. 62/079,662, filed Nov. 14, 2014.

The present invention relates to a process for the preparation of flocculated filler particles, flocculated filler particles obtained from said process and their use as well as to products containing said flocculated filler particles.

Mineral materials and binders are among the main constituents used in the manufacture of numerous products such as paints, paper and plastic materials. Therein, mineral materials contribute to mechanical and optical properties, while the binders, generally latex-based and in the form of aqueous suspensions or dispersions, provide the necessary adhesion and cohesion for the respective constituents of the end product to be produced.

In order to avoid the logistic difficulties of handling mineral materials and binders separately, and further to avoid the unwanted physical and chemical interactions developed in comparable mixtures of mineral materials and binders, self-binding pigment particles have been developed and are known to industry. In this regard, self-binding pigment particles having both the properties of the mineral material and of the binder may be directly implemented in a variety of applications. This unique product named self-binding pigment particles refers to distinct, solid particles, formed of mineral material and binder that are intimately bound to one another. The internal cohesion forces are such as to provide the self-binding pigment particles with excellent mechanical stability.

Self-binding pigment particles can be produced from calcium carbonate containing mineral materials, for example, from natural mineral pigment materials which are commonly prepared by a process implementing at least one step of grinding mineral materials in the presence of binder. Grinding refers to an operation leading to a reduction in the particle size, i.e. the mineral materials in the self-binding pigment particles have a smaller diameter than the initial mineral material used to produce them. Such self-binding pigment particles are described in a number of documents, including WO 2006/008657, WO 2006/128814, and WO 2008/139292. Processes for preparing self-binding pigment particles are also known from EP 2 505 614 A1, EP 2 505 615 A1, EP 2 565 237 A1, EP 2 565 236 A1, EP 2 662 416 A1, EP 2 379 649 A1, EP 2 662 417 A1, and EP 2 662 419 A1. EP 1 747 252 A1 relates to a method for producing surface-modified inorganic fillers.

The processes for preparing self-binding mineral pigment particles known in the art are often limited to the preparation or the co-grinding of suspensions having a low solids content. However, the preparation of low solids content suspensions has the disadvantage that the obtained ground product has to be concentrated before being shipped to other facilities for further processing. During the time and energy consuming concentrating step, very often an undesired loss of polymeric binder is observed, and, additionally, unwanted agglomerates are formed. Furthermore, the prior art processes often lead to a suspension having a high total organic content of the aqueous phase of the ground suspension. Moreover, the addition of dispersant, however, inter alia affects the adsorption of the binder to the particles during co-grinding.

A further problem, which very often has significant impact on the mechanical and optical properties of papers and paper coatings made from such self-binding pigment particles, is encountered in respect to the binding between the fibres and such self-binding pigment particles. The self-binding pigment particle suspensions often diminish the mechanical and optical properties of the corresponding end products. One reason for this may be the shape of the self-binding pigment particles, which could hamper the interaction between the self-binding pigment particles and the fibres of the paper. Thus, to produce paper articles with well-adjusted mechanical and optical properties, the interaction boundaries between the self-binding pigment particles and the fibres in the paper have to be optimized.

Furthermore, high filler levels in paper are desirable since these would provide the possibility to reduce the amount of wood fibres in the paper. Moreover, papers with high filler content will dry faster, and, as a result, the paper machine can run faster. Consequently, the addition of high levels of filler can reduce paper production costs and can save natural resources. However, such high filler levels often reduce the area of contact between the remaining fibres. As a result, retaining high amounts of filler with a suboptimal shape produces a weaker sheet that can break more easily on the paper machines, size presses, coaters, winders, printing presses, printing machines, or copy machines.

U.S. Pat. No. 5,611,890 A relates to a strong, soft filled tissue paper comprising a non-cellulosic particulate filler, wherein said filler comprises 5 to 50 wt.-% of said tissue paper. WO 03/087472 A1 discloses a filler treatment comprising the preparation of swollen starch-latex compositions, and the addition of said compositions to a filler suspension. The use of these treated fillers during papermaking improves filler retention and produces filled papers, where addition of the filler has only a minimal negative effect on strength properties. A papermaking filler material which has been surface treated with a cationic polymer is described in CA 2,037,525 A1. The article "Improvement of paper properties using starch-modified precipitated calcium carbonate filler" of Zhao et al., TAPPI Journal 2005, vol. 4(2), is concerned with commercial precipitated calcium carbonate fillers that have been modified with corn and potato raw starches. These modified fillers were used as papermaking fillers to improve the strength in high filler content papers.

It has also been proposed to utilize pre-flocculated filler compositions in papermaking. In such pre-flocculated filler compositions the filler is accompanied in aqueous suspension by a flocculant which modifies the condition and in some cases the effective particle size of the filler. Such compositions may have an enhanced ability to flocculate onto the paper fibres, enabling higher filler loadings in paper while maintaining good strength and optical properties. Methods of preparing stable dispersions of flocculated filler particles for use in papermaking processes are described in WO 2014/070488 A1, WO 2013/158811 A1, WO 2010/126712 A1 and WO 2009/036271 A1. WO 2013/107933 A1 relates to a method for producing paper involving the use of a pre-treated filler dispersion comprising flocs.

In view of the foregoing, improving the self-binding pigment particle production process remains of interest to the skilled man.

Accordingly, it is an object of the present invention to provide filler particles, which are self-binding, and thus, do not require the presence of a binder during paper production processes. It would be desirable to provide self-binding filler particles that improve the binding between the fibres in papers and paper coatings and the self-binding filler particles, and, thus, allows for the production of paper articles or fleece materials with well-adjusted mechanical and optical properties. In particular, it is desirable, to provide filler particles that show a good retention in paper production processes, and avoid the use of large amounts of retention aids.

It would be especially desirable to provide a process for making such filler particles, wherein the mineral pigment particles do not have to be co-ground with the binder since milling is a very cost- and time-consuming step. Furthermore, the particle structure of the filler particles can change during milling and, therefore, the characteristics of the mineral pigment particles may be different after milling. Moreover, it is desirable to provide a process for the manufacturing of specific filler particles allowing control of certain properties of the paper, e.g. brightness, opacity, air permeability, bulk, printability, or mechanical properties.

The foregoing and other objectives are solved by the subject-matter as defined herein in the independent claims.

According to one aspect of the present invention, a process for the preparation of flocculated filler particles is provided, comprising the steps of
 a) providing at least two aqueous suspensions each comprising at least one filler material, characterized in that
  i) a first aqueous suspension S1 comprises at least one flocculating additive A, and
  ii) a second aqueous suspension S2 comprises at least one flocculating additive B which is different from flocculating additive A, and
  iii) the at least one filler material in the first aqueous suspension S1 and the second aqueous suspension S2 is different, and
 b) combining the at least two aqueous suspensions provided in step a) by bringing them together to form an aqueous suspension SM of flocculated filler particles, wherein the mass ratio of the at least one filler material in the first aqueous suspension and the second aqueous suspension S1:S2 is from 1:100 to 100:1.

According to another aspect of the present invention, a process for the preparation of a fleece comprising steps a) and b) of the process according to the present invention is provided, characterized in that the aqueous suspension SM of flocculated filler particles obtained after process step b) is combined in a further step c) with synthetic and/or natural fibres, and the resulting suspension SMF is subjected to a dewatering step d) to obtain a fleece.

According to still another aspect of the present invention, a flocculated filler particle suspension obtained by a process according to the present invention is provided, characterized in that the filler particles have a mono-modal particle size distribution and/or a volume defined particle size polydispersity expressed as full width at half maximum height (FWHM) of less than 45 μm and/or a volume determined median particle size ($d_{50}$) in the range from 5 to 50 μm.

According to still another aspect of the present invention, a flocculated filler particle suspension is provided, characterized in that the filler particles have a mono-modal particle size distribution and/or a volume defined particle size polydispersity expressed as full width at half maximum height (FWHM) of less than 45 μm and/or have a volume determined median particle size ($d_{50}$) in the range from 5 to 50 μm.

According to still another aspect of the present invention, a fleece, preferably a sheet of paper, obtained by a process according to the present invention is provided.

According to still another aspect of the present invention, a use of a flocculated filler particle suspension according to the present invention in paper coating and/or paper wet end applications, preferably in high filler load paper wet end applications, or for cigarette paper is provided.

Advantageous embodiments of the present invention are defined in the corresponding sub-claims.

According to one embodiment step b) is carried out by bringing the first aqueous suspension S1 and the second aqueous suspension S2 simultaneously together.

According to another embodiment the Brookfield viscosity of the first aqueous suspension S1 and/or the second aqueous suspension S2 and/or the aqueous suspension SM is less than 5 000 mPa·s at 25° C., preferably less than 1 000 mPa·s at 25° C., and more preferably between 10 and 200 mPa·s at 25° C.

According to one embodiment the at least one flocculating additive A is a cationic polymer selected from the group consisting of cationic starch, polyamines, polyethyleneimines, polyacrylamides, cationic amine amide, epichlorohydrin resins, polydiallyldimethylammonium chloride, cationic guar and/or mixtures thereof, preferably the at least one flocculating additive A is cationic starch. According to another embodiment the at least one flocculating additive B is an anionic polymer selected from the group consisting of carboxymethyl cellulose, anionic starch, anionic guar, anionic xanthan gum and/or mixtures thereof, preferably the at least one flocculating additive B is anionic carboxymethyl cellulose.

According to one embodiment the aqueous suspension SM is sheared during and/or after process step b), preferably in at least two steps at different shear rates, and more preferably in at least two steps at different shear rates, wherein the first shear rate is lower than the second shear rate. According to another embodiment the at least one filler material is selected from the group consisting of a calcium carbonate-comprising material like ground calcium carbonate, precipitated calcium carbonate, modified calcium carbonate, talc, clay, dolomite, marble, titanium dioxide, kaolin, silica, alumina, mica, aluminium trihydrate, magnesium hydroxide, plastic pigments, a hybrid material comprising an organic filler and an inorganic chemical composition and mixtures thereof, preferably the at least one filler material is precipitated calcium carbonate.

According to one embodiment the at least one filler material in the first aqueous suspension S1 and the at least one filler material in the second aqueous suspension S2 is different and the at least one filler material is selected from the group consisting of a calcium carbonate-comprising material like ground calcium carbonate, precipitated calcium carbonate, modified calcium carbonate, talc, clay, dolomite, marble, titanium dioxide, kaolin, silica, alumina, mica, aluminium trihydrate, magnesium hydroxide, plastic pigments, and mixtures thereof, preferably the filler material in the first suspension S1 is ground calcium carbonate and the filler material in the second suspension S2 is selected from precipitated calcium carbonate and/or clay.

According to one embodiment the content of the at least one flocculating additive A in the first aqueous suspension S1 is from 0.001 to 20 wt.-%, more preferably from 0.5 to 10 wt.-%, and most preferably from 3 to 5 wt.-%, based on the total weight of the first aqueous suspension S1, and/or the content of the at least one flocculating additive B in the second aqueous suspension S2 is from 0.001 to 20 wt.-%, more preferably from 0.1 to 10 wt.-%, and most preferably from 0.2 to 0.8 wt.-%, based on the total weight of the second aqueous suspension S2. According to another embodiment the content of the at least one filler material in the first aqueous suspension S1 is from 1 to 85 wt.-%, preferably from 15 to 65 wt.-%, and most preferably from 10 to 40 wt.-%, based on the total weight of the first aqueous suspension S1, and the content of the at least one filler material in the second aqueous suspension S2 is from 1 to 85 wt.-%, preferably from 15 to 65 wt.-%, and most preferably from 10 to 40 wt.-%, based on the total weight of the second aqueous suspension S2.

According to one embodiment the mass ratio of the at least one filler material in the first aqueous suspension and the second aqueous suspension S1:S2 is between 99:1 and 1:99, preferably between 95:15, and 5:85 most preferably between 70:30 and 30:70. According to another embodiment the solids content of the aqueous suspension SM obtained after process step b) is from 1 to 75 wt.-%, preferably from 2 to 60 wt.-%, and most preferably from 5 to 35 wt.-%, based on the total weight of the aqueous suspension SM.

According to one embodiment the dewatering step d) is carried out on a screen, preferably via a head box of a paper machine.

It should be understood that for the purpose of the present invention, the following terms have the following meaning:

A "suspension" or "slurry" in the meaning of the present invention comprises insoluble solids and a solvent or liquid, preferably water, and optionally further additives, and usually contains large amounts of solids and, thus, is more viscous and can be of higher density than the liquid from which it is formed.

A "filler material" in the meaning of the present invention can be a natural or synthetic pigment or a mineral material. Moreover, the filler material can be a hybrid material comprising an organic filler and an inorganic chemical composition. These compounds are inter alia described in EP 1 773 950 A2.

For the purpose of the present invention, a "mineral material" is a solid substance having a definite inorganic chemical composition and characteristic crystalline and/or amorphous structure. For example, a mineral material may encompass calcium carbonate such as calcite, aragonite, marble, limestone and chalk, talc, dolomite, mica, titanium dioxide, aluminium trihydrate such as gibbsite, bayerite, magnesium hydroxide such as brucite, hydromagnesite, and mixtures thereof.

A "calcium carbonate comprising material" in the meaning of the present invention can be a mineral material or a synthetic material having a content of calcium carbonate of at least 50 wt.-%, preferably 75 wt.-%, more preferably 90 wt.-%, and most preferably 95 wt.-%, based on the total weight of the calcium carbonate containing material.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium and a carbonate source in water. Additionally, precipitated calcium carbonate can also be the product of introducing calcium and carbonate salts, calcium chloride and sodium carbonate for example, in an aqueous environment.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, EP 2 070 991 A1, or 2 264 108 A1.

Throughout the present document, the "particle size" of a filler material or other particulate material is described by its distribution of particle sizes. The value $d_x$ represents the diameter relative to which x % by volume of the particles have diameters less than $d_x$. The $d_{50}$ value is thus the volume determined medium particle size, i.e. 50% of the total volume of all particles results from particles bigger and 50% of the total volume of all particles results from particles smaller than this particle size. For the purpose of the present invention the particle size is specified as volume determined particle size $d_{50}$ unless indicated otherwise. For determining the volume determined medium particle size $d_{50}$ a Mastersizer 2000 or Mastersizer 3000 from the company Malvern Instruments Ltd., Great Britain, using the Fraunhofer light scattering model. The weight determined particle size distribution may correspond to the volume determined particle size if the density of all the particles is equal.

The term "mono-modal particle size distribution" as used herein refers to a collection of particles which have a single clearly discernible maximum on a particle size distribution curve (frequency on the ordinate or y-axis, and particle size on the abscissa or x-axis).

In other words, less than 10%, of the area under a particle size distribution curve occurs outside the distribution defined around a single peak.

The term "volume defined particle size polydispersity" is to be understood as a characteristic describing the breadth of distribution of particle size to be found amongst the pigment particles. For the purpose of the present invention the volume defined particle size polydispersity is expressed as full width at half maximum of the single particle size distribution peak. In case the particle size distribution is not mono-modal, the full width at half maximum relates to the main particle size distribution peak, i.e. the peak of the particle size distribution having the largest area under the curve. A "full width at half maximum (FWHM)" is an expression of the extent of a function, given by the difference between the two extreme values of the independent variable at which the dependent variable is equal to half of its maximum value. The technical term full width at half maximum, or FWHM, is used to approximate the diameter distribution of the majority of the particles, i.e. the polydispersity of the particle sizes.

In the gist of present invention a "flocculating additive" is a compound which can promote flocculation by causing suspended filler particles to form aggregates called flocs. The flocculating additive may cause flocculation in combination with another additive, preferably another flocculating additive, and/or with the filler material alone. In case that the flocculation occurs with the filler material alone, this flocculation can be distinguished from the flocculation occurring after combining step b) of the process of the present invention. For example, the flocs which form after the process step b) may have a different particles size than the flocs generated from one flocculating agent and the mineral filler alone.

As used herein the term "polymer" generally includes homopolymers and co-polymers such as, for example, block, graft, random and alternating copolymers, as well as blends and modifications thereof.

The term "anionic polymer" in the meaning of the present invention refers to a polymer having a negative net charge. Said compound is typically modified with anionic groups. The term "anionic" does not exclude the presence of cationic groups provided that the sum of individual charges is negative. The term "cationic polymer" in the meaning of the present invention refers to a polymer having a net positive charge. Said compound is typically modified with cationic groups. The term "cationic" does not exclude the presence of anionic groups provided that the sum of individual charges is positive.

The term "positive charges" is to be understood hereinafter to mean that the particles have a positive zeta potential at their surface (cf. P. Ney "Zeta potentials and floatability of minerals", Applied Mineralogy 6, Springer Publications, Vienna, N.Y., 1973, especially page 22 et seq.). This applies analogously to the "negative charges" as occur for example in cellulose fibre and anionically stabilized suspensions. For the neutral "charges", with respect to the particles, towards the outside the negative and positive charges cancel each other out. The isoelectric point need not lie at pH=7. The isoelectric point of particle surfaces and amphoteric polyelectrolytes and/or their salts, partial salts and/or full salts lies at the pH value at which the positive and negative charges neutralize each other mutually towards the outside.

Within the framework of the invention, "neutral monomer units" mean monomer units which do not contain any dissociable groups (for example the —COOH group), e.g. ethylene groups.

The externally, i.e. towards the outside, charged and externally neutral polymers are defined in the present application by the number of the positive or negative groups in the polymer. Accordingly, in the amphoteric externally neutral polymers the number of the positive charges in the cationic monomer units is equal to the number of the negative charges in the anionic monomer units. In the amphoteric cationic polymers the non-neutral monomer units carry predominantly positive charges. In the amphoteric anionic polymers the non-neutral monomer units carry predominantly negative charges. This does not however mean that for example with an excess of positive charges the polymers is automatically electrically positive. This is because the "acid strength" and the "base strength" may each be different. Thus, for example, an amphoteric polymer having an equal number of positive and negative groups may be electrically either positive or negative or neutral. This applies correspondingly also to the amphoteric cationic polymers and the amphoteric anionic polymers. By changing the pH value the dissociation of the "acid or base groups" can be influenced. The neutralization of the negative groups with mono and/or bi and/or trivalent cations also influences their dissociation degree and thus the charge state towards the outside.

The term "intrinsic viscosity" as used in the context of the present invention is a measure of the capability of a polymer in solution to enhance the viscosity of the solution and is specified in ml/g.

Throughout the present document, the "degree of carboxylation" is specified in respect to the total amount of hydroxyl groups per unmodified monomer unit of the original polysaccharide. A "degree of carboxylation" of 1 means that one of the three hydroxyl groups of the unmodified monomer unit of the original polysaccharide is carboxylated.

As used in the context of the present invention, the term "fleece" refers to a flat material produced by pressing together moist fibres, and drying them into flexible sheets. The fibres can be synthetic or natural fibres. Examples of a fleece are paper-like materials such as paper, cardboard, or containerboard.

A "specific BET surface area" (SSA) in the meaning of the present invention is defined as the surface area of the filler material particles divided by the mass of said particles. As used therein the specific surface area is measured by adsorption using the BET isotherm (ISO 9277:1995) and is specified in $m^2/g$.

For the purpose of the present invention, the "solids content" of a liquid composition is a measure of the amount of material remaining after all the solvent or water has been evaporated.

For the purpose of the present invention, the term "viscosity" or "Brookfield viscosity" refers to Brookfield viscosity. The Brookfield viscosity is for this purpose measured by a Brookfield (Type RVT) viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, and for a viscosity range between 800 and 3 200 mPa·s the spindle number 5 may be used.

The term "dry" filler material is understood to be a filler material having less than 0.3% by weight of water relative to the filler material weight. The % water (equal to "residual total moisture content") is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

For the purpose of the present invention, the term "shear rate" refers the rate at which a progressive shearing deformation is applied to a material. Throughout the present invention, the shear rate for a fluid between two surfaces that occurs by the relative movement between the two surfaces in the present invention is defined according to:

$$\dot{\gamma} = \frac{v}{h}$$

whereas
$\dot{\gamma}$ is the shear rate in (1/s),
v is the relative velocity between the two surfaces in (m/s), and
h is the distance between the two surfaces in (m). In case of a stirrer, h corresponds to the distance between the outermost circumference of the stirrer and the inner diameter of the vessel.

Alternatively, the shear rate for a fluid in a pipe in the present invention is defined as:

$$\dot{\gamma} = \frac{4Q}{\pi r^3}$$

whereas
$\dot{\gamma}$ is the shear rate in (1/s),
Q is the volumetric flow of the fluid in (m³/s), and
r is the inner pipe radius in (m).

For the sake of simplicity, the fluid is considered to be Newtonian in these calculations and turbulent flow is not considered. However, if a more accurate calculation of the shear rates is needed, models as presented e.g. by Jie Wu et al., AIChE Journal, July 2006, Vol. 52, No. 7, 2323-2332, can also be applied.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" even though such a limited understanding is always included by the terms "obtained" or "defined" as a preferred embodiment.

The inventive process for the preparation of flocculated filler particles comprises the steps of (a) providing at least two aqueous suspensions each comprising at least one filler material, and (b) combining the at least two aqueous suspensions provided in step (a) by bringing them together to form an aqueous suspension SM of flocculated filler particles, wherein the mass ratio of the at least one filler material in the first aqueous suspension and the second aqueous suspension S1:S2 is from 1:100 to 100:1. The at least two aqueous suspensions provided in step (a) are characterized in that (i) a first aqueous suspension S1 comprises at least one flocculating additive A, and (ii) a second aqueous suspension S2 comprises at least one flocculating additive B which is different from flocculating additive A, and (iii) the at least one filler material in the first aqueous suspension S1 and the second aqueous suspension S2 is different. The pH value of both aqueous suspensions S1 and S2 may be the same or different and can be adjusted by the addition of Brønstedt acids or bases. Moreover, the charge of the filler particles in the aqueous suspensions S1 and S2 may be the same or different.

In the following the details and preferred embodiments of the inventive process will be set out in more detail. It is to be understood that these technical details and embodiments also apply to the inventive flocculated filler particle suspensions, their use, and products containing the same.

The Filler Material

According to step a) of the process of the present invention at least two aqueous suspensions are provided each comprising at least one filler material.

The term "aqueous" suspension refers to a system, wherein the liquid phase or solvent of the suspension comprises, preferably consists of, water. However, said term does not exclude that the aqueous suspension comprises an organic solvent selected from the group comprising alcohols such as methanol, ethanol, isopropanol, carbonyl-group containing solvents such as ketones, e.g. acetone or aldehydes, esters such as isopropyl acetate, carboxylic acids such as formic acid, sulphoxides such as dimethyl sulphoxide, and mixtures thereof. If the aqueous suspension comprises an organic solvent, the aqueous suspension comprises the organic solvent in an amount up to 40.0 wt.-% preferably from 1.0 to 30.0 wt.-% and most preferably from 1.0 to 25.0 wt.-%, based on the total weight of the liquid phase of the aqueous suspension. For example, the liquid phase of the aqueous suspension consists of water. If the liquid phase of the aqueous suspension consists of water, the water to be used can be any water available such as tap water and/or deionised water.

The term "at least two" aqueous suspensions in the meaning of the present invention means that two or more aqueous suspensions are provided in step a).

In one embodiment of the present invention, two aqueous suspensions are provided in step a). Alternatively, three or more aqueous suspensions are provided in step a). For example, two or three aqueous suspensions are provided in step a). Preferably, two aqueous suspensions are provided in step a).

Thus, at least a first aqueous suspension S1 and a second aqueous suspension S2 are provided in step a).

According to one embodiment of the present invention, the aqueous suspensions are obtained by mixing particles of the at least one filler material with a solvent, preferably water. The at least one filler material to be mixed with a solvent, and preferably water, may be provided in any form, for example, as suspension, slurry, dispersion, paste, powder, a moist filter cake or in pressed or granulated form. In a preferred embodiment the at least one filler material is provided in form of a powder. In another preferred embodiment the at least one filler material is provided in form of a slurry, and more preferably in form of an aqueous slurry. Said slurry may have a solids content from 1 to 85 wt.-%, even more preferably from 10 to 75 wt.-%, and most preferably from 15 to 65 wt.-%, based on the total weight of the slurry.

According to one embodiment the content of the at least one filler material in the first aqueous suspension S1 is from 1 to 85 wt.-%, preferably from 15 to 65 wt.-%, and most preferably from 10 to 40 wt.-%, based on the total weight of the first aqueous suspension S1, and the content of the at least one filler material in the second aqueous suspension S2 is from 1 to 85 wt.-%, preferably from 15 to 65 wt.-%, and most preferably from 10 to 40 wt.-%, based on the total weight of the second aqueous suspension S2.

The solids content of the aqueous suspensions can be adjusted by the methods known to the skilled person. To adjust the solids content of an aqueous suspension, the aqueous suspension may be partially dewatered by a settling, filtration, centrifugation or thermal separation process. For example, the first aqueous suspension S1 of the at least two aqueous suspensions provided in step a) is obtained by partially dewatering an aqueous suspension by centrifugation to the desired solids content and/or the second aqueous suspension S2 of the at least two aqueous suspensions provided in step a) is obtained by partially dewatering the supernatant separated from the first aqueous suspension by settling to the desired solids content. The partial dewatering by centrifugation and/or settling can be carried out by using methods well known to the skilled person.

It is a requirement of the process of the present invention that the mass ratio of the at least one filler material in the first aqueous suspension and the second aqueous suspension S1:S2 is from 1:100 to 100:1.

According to one embodiment, the mass ratio of the at least one filler material in the first aqueous suspension and the second aqueous suspension S1:S2 is between 99:1 and 1:99, preferably between 95:15, and 5:85 most preferably between 70:30 and 30:70. According to another embodiment, the mass ratio of the at least one filler material in the first aqueous suspension and the second aqueous suspension S1:S2 is from 1:75 to 75:1, preferably from 1:50 to 50:1, more preferably from 1:25 to 25:1, even more preferably from 1:10 to 10:1, and most preferably from 1:5 to 5:1. The mass ratio is based on the dry weight of the at least one filler material.

According to one embodiment of the present invention, the filler material is a natural or synthetic pigment or mineral material. According to another embodiment, the filler material can be a hybrid material comprising an organic filler, e.g. starch, and an inorganic chemical composition, e.g., a mineral material. Hybrid materials are inter alia described in EP 1 773 950 A2.

The at least one filler material may be selected from the group consisting of a calcium carbonate-comprising material, a mixed carbonate based filler, talc, clay, dolomite, marble, titanium dioxide, kaolin, silica, alumina, mica, aluminium trihydrate, magnesium hydroxide, plastic pigments, and mixtures thereof.

According to one embodiment, the at least one filler material is a calcium carbonate-comprising material, preferably selected from the group consisting of ground calcium carbonate, precipitated calcium carbonate, modified calcium carbonate, and mixtures thereof. According to a preferred embodiment the at least one filler material is precipitated calcium carbonate.

Ground (or natural) calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the source of ground calcium carbonate (GCC) is selected from marble, chalk, dolomite, limestone, or mixtures thereof. Preferably, the source of ground calcium carbonate is selected from marble. According to one embodiment of the present invention the GCC is obtained by dry grinding. According to another embodiment of the present invention the GCC is obtained by wet grinding and subsequent drying.

"Dolomite" in the meaning of the present invention is a carbonic calcium-magnesium-mineral having the chemical composition of $CaMg(CO_3)_2$ ("$CaCO_3.MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate-comprising material comprises one ground calcium carbonate. According to another embodiment of the present invention, the calcium carbonate-comprising material comprises a mixture of two or more ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation by combining calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate-comprising material comprises one precipitated calcium carbonate. According to another embodiment of the present invention, the calcium carbonate-comprising material comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to one embodiment of the present invention, the calcium carbonate-comprising material is a ground calcium carbonate. According to another embodiment of the present invention, the calcium carbonate-comprising material is precipitated calcium carbonate. According to still another embodiment of the present invention, the calcium carbonate-comprising material is a mixture of ground calcium carbonate and precipitated calcium carbonate.

A modified calcium carbonate (MCC) may feature a GCC or PCC with a surface and/or internal structure modification. A surface-reacted calcium carbonate may be prepared, for example, by providing a GCC or PCC in form of an aqueous suspension, and adding an acid to said suspension. Suitable acids are, for example, sulphuric acid, hydrochloric acid, phosphoric acid, citric acid, oxalic acid, or a mixture thereof. In a next step, the calcium carbonate is treated with gaseous carbon dioxide. If a strong acid such as sulphuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, or EP 2 264 108 A1. According to one embodiment, the modified calcium carbonate is a surface-reacted calcium carbonate, preferably obtained from the reaction with sulphuric acid, hydrochloric acid, phosphoric acid, citric acid, oxalic acid, or a mixture thereof, and carbon dioxide.

According to one embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide or calcium carbonate-titanium dioxide co-structures.

Examples of aluminium trihydrate are gibbsite or bayerite, and examples of magnesium hydroxide are brucite or hydromagnesite. Examples of plastic pigments include styrene pigments and Ropaque™ (The Dow Chemical Company, USA).

According to one embodiment of the present invention, the at least one filler material is provided in form of particles having a volume determined median particle diameter $d_{50}$ of less than or equal to 100 µm, preferably from 0.1 to 100 µm, more preferably from 0.2 to 50 µm, even more preferably from 0.5 to 25 µm, and most preferably from 1.0 to 10 µm. According to another embodiment of the present invention, the at least one filler material is provided in form of particles having a volume determined median particle size $d_{50}$ of 0.3 to 15 µm, preferably from 0.5 to 10 µm, and more preferably from 1.0 to 5.0 µm.

According to a preferred embodiment of the present invention, the at least one filler material is provided in form of particles having a specific surface area from 0.1 to 200 m$^2$/g, preferably from 0.5 to 100 m$^2$/g, more preferably from 1.0 to 50 m$^2$/g, and most preferably from 2.0 to 10 m$^2$/g, measured using nitrogen and the BET method according to ISO 9277:2010.

It is a requirement of the present invention that the at least one filler material is different in the first aqueous suspension S1 and the second aqueous suspension S2. Thus, the first aqueous suspension S1 comprises at least one first filler material and the second aqueous suspension S2 comprises at least one second filler material. Optionally, further following suspension can be present (S3 to SN), which may comprise the same filler material as the first aqueous suspension S1 or the second aqueous suspension S2 or may comprise at least one different filler material.

The at least one filler material in the first aqueous suspension S1 and the at least one filler material in the second aqueous suspension S2 may differ in the type of filler material and/or the volume determined median particle diameter $d_{50}$ the filler material particles and/or the specific surface area of the filler material particles and/or crystal morphology of the filler material and/or the charge of the filler material.

Furthermore, the first aqueous suspension S1 and the second aqueous suspension S2 may differ in their pH value. For example, the first aqueous suspension S1 may have a pH value of above 7 and the second aqueous suspension S2 may have a pH value of below 7, or vice versa. It is known to the skilled person that the pH value of the suspensions can be adjusted by the addition of Brønstedt acids or basis. Examples of suitable acids are hydrochloric acid, sulphuric acid, phosphoric acid, or citric acid. Examples of suitable basis are sodium hydroxide, potassium hydroxide, or sodium carbonate.

According to one embodiment of the present invention, the at least one filler material in the first suspension S1 is ground calcium carbonate and the at least one filler material in the second suspension S2 is selected from precipitated calcium carbonate and/or clay. According to another embodiment of the present invention, the at least one filler material in the first suspension S1 is precipitated calcium carbonate having an aragonitic crystal morphology and the at least one filler material in the second suspension S2 is precipitated calcium carbonate having a scalenohedral crystal morphology.

According to one embodiment of the present invention, the at least one filler material in the first suspension S1 has a volume determined median particle diameter $d_{50}$ of less than or equal to 100 µm, preferably from 0.1 µm to 100 µm, more preferably from 0.2 to 50 µm, and the filler material in the second suspension S2 has a volume determined median particle diameter $d_{50}$ of less than or equal to 100 µm, preferably from 0.1 µm to 100 µm, more preferably from 0.2 to 50 µm. According to another embodiment of the present invention, the at least one filler material in the first suspension S1 has a specific surface area from 0.1 to 200 m$^2$/g, preferably from 0.5 µm to 100 m$^2$/g, more preferably from 1 µm to 50 m$^2$/g, and most preferably from 1 to 10 m$^2$/g, and the filler material in the second suspension S2 has a specific surface area from 0.1 to 200 m$^2$/g, preferably from 0.5 µm to 100 m$^2$/g, more preferably from 1 µm to 50 m$^2$/g, and most preferably from 1 to 10 m$^2$/g, measured using nitrogen and the BET method according to ISO 9277:2010.

Flocculating Additive A

According to step i) of the process according to the present invention, a first aqueous suspension S1 comprises at least one flocculating additive A.

The at least one flocculating additive A may be selected from any flocculating additive known in the art, which promotes flocculation by causing suspended filler particles to form aggregates called flocs, in combination with another additive, preferably another flocculating additive, and/or with the filler material alone. The at least one flocculating additive A may be selected from anionic, non-ionic, zwitterionic, amphoteric, or cationic polymers, or mixtures thereof. Preferably, the at least one flocculating additive A is a cationic polymer.

According to one embodiment of the present invention, the at least one flocculating additive A is a cationic polymer selected from the group consisting of cationic starch, polyamines, polyethyleneimines, polyacrylamides, cationic amine amide, epichlorohydrin resins, polydiallyldimethylammonium chloride, cationic guar and/or mixtures thereof.

According to one embodiment of the present invention, the cationic polymer is a cationic starch.

The cationic starch is preferably chemically modified with cationic groups selected from the group comprising amino groups, immonium groups, ammonium groups, sulphonium groups, phosphonium groups, and mixtures thereof. The cationic starch can be chosen from amongst the chemically modified starches originating from virtual any natural sources providing for starch in reasonable amounts. For example, the cationic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the cationic starch is selected from those enriched in amylopectin, that is to say the chemically modified starch is preferably selected from the group consisting of rice starch, potato starch, and mixtures thereof. The cationic starch can also be obtained from genetically modified sources comprising amylopectin enriched starches. Methods for preparing such cationic starches are known by the skilled person. The molecular weight of the cationic starch can range from 1 000 to 1 000 000 g/mol and is generally about 220 000 g/mol. The molecular weight of the cationic starch can be adjusted by the treatment with hydrogen peroxide ($H_2O_2$). According to one embodiment of the present invention, the cationic polymer is a polyamine, preferably a polyethyleneimine (PEI) being selected from the group comprising branched polyethyleneimines, linear polyethyleneimines and mixtures of the foregoing. Preferably, the ratio of primary, secondary and tertiary amine functions in the branched polyethyleneimines is in the range of 1:0.86:0.42 to 1:1.20:0.76, prior to a possible modification of the branched polyethyleneimines.

According to one preferred embodiment of the present invention, the polyethyleneimine is selected from the group of modified and unmodified polyethyleneimines. Examples for suitable polyethyleneimines are homopolymers of ethyleneimine (aziridine) or its higher homologues and also the graft polymers of polyamidoamines or polyvinylamines with ethyleneimine or its higher homologues. The polyethyleneimines can be crosslinked or uncrosslinked, quaternized and/or modified by reaction with alkylene oxides, dialkyl or alkylene carbonates or $C_1$-$C_8$-carboxylic acids. The polyethyleneimines may be modified by reaction with alkylene oxides such as ethylene oxide, propylene oxide or butylene oxide, dialkyl carbonates such as dimethyl carbonate and diethyl carbonate, alkylene carbonates such as ethylene carbonate or propylene carbonate, or $C_1$-$C_8$-carboxylic acids. Modified PEIs can include alkoxylated polyethyleneimines such as propoxylated polyethyleneimines (PPEIs) and ethoxylated polyethyleneimines (EPEIs). Further preferred modified polyethyleneimines can be obtained by reacting the unmodified PEIs with one or more $C_1$-$C_{28}$-fatty acids, preferably with one or more $C_6$-$C_{18}$-fatty acids and especially preferred with $C_{10}$-$C_{14}$-fatty acids, like, for example, coconut fatty acid.

The polyethyleneimine can have a weight average molecular weight $M_w$ in the range of 1 000 g/mol and 1 000 000 g/mol. In another preferred embodiment of the present invention the polyethyleneimine is selected from the group of linear polyethyleneimines having a weight average molecular weight $M_w$ from 100 to 700 g/mol, and preferably from 146 to 232 g/mol, and preferably is selected from triethylenetetramine, pentaethylenehexamine and tetraethylenepentamine. According to another preferred embodiment the polyethyleneimine is selected from the group of branched polyethyleneimines having a weight average molecular weight $M_w$ from 500 to 8 000 g/mol and preferably from 800 to 1 200 g/mol.

Further examples of cationic polymers that are suitable for the process of the present invention are polyacrylamides, or cationic epichlorohydrin resins.

According to an exemplary embodiment, the polyacrylamides include monomers of dialkylaminoethyl(meth)acrylates, dialkylaminoethyl(meth)acrylamides, dialkylaminomethyl(meth)acrylamides, and dialkylamino-1,3-propyl (meth)acrylamides, preferably copolymerized with nonionic monomers, preferably arylamide.

According to another embodiment, the cationic epichlorohydrin resins are copolymers comprising as the monomer one or more dicarboxylic acids and one or more monomers from the group of diamines, triamines, dialkanolamines or trialkanolamines and epichlorohydrin.

Preferably saturated or unsaturated, branched or unbranched $C_2$-$C_{10}$ dicarboxylic acids, preferably $C_3$-$C_9$ dicarboxylic acids, $C_4$-$C_8$ dicarboxylic acids, $C_5$-$C_7$ dicarboxylic acids, in particular adipic acid are used as the dicarboxylic acid monomers. Especially suitable as the second monomer of the flocculating additive A are linear and branched, substituted and unsubstituted diamines and triamines, in particular N-(2-aminoethyl)-1,2-ethanediamine. Preferably used dialkanolamines and trialkanolamines include, for example, diethanolamine, N-alkyl-dialkanolamines such as N-methyl and N-ethyldiethanolamine and triethanolamine. For monitoring and control of the molecular weight and/or the chain length, one or more monovalent amines such as monoalkanolamines may be used during the polycondensation. Monoethanol is used preferably. The resulting intermediate product is reacted further with epichlorohydrin.

According to a preferred embodiment of the present invention, the cationic epichlorohydrin resin is a copolymer of adipic acid with N-(2-aminoethyl)-1,2-ethanediamine and epichlorohydrin.

According to still another embodiment of the present invention, the cationic polymer is polydiallyldimethylammonium chloride (polyDADMAC).

PolyDADMAC (polydiallyldimethylammonium chloride) is a linear homopolymer of diallyldimethylammonium chloride (DADMAC) having the following structure:

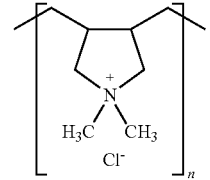

The linear homopolymer formed from a monomer that has a quaternary ammonium and two unsaturated —CH═$CH_2$ functionalities is polymerized by free-radical polymerization of the DADMAC. In the polyDADMAC structure quaternary ammonium groups are on rings that are included in the backbone of the polymer chain. This composition means that the polyDADMAC macromolecules tend to be quite stiff, having a longer persistence length than, for instance, polyamines. For this reason, polyDADMAC is expected to have a more extended conformation in solution. The polyDADMAC can have a weight average molecular weight $M_w$ in the range from 10 000 to 1 000 000 g/mol and preferably in the range from 100 000 to 500 000 g/mol.

According to still another embodiment of the present invention, the cationic polymer is a cationic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. A cationic guar can be obtained by reacting guar with derivatives of quaternary ammonium salts.

The at least one flocculating additive A may comprise one or more of the aforementioned cationic polymers and one or more further flocculating additives known in the art. According to one embodiment of the present invention, the at least one flocculating additive A is a mixture of two or more of the aforementioned cationic polymers. According to another embodiment of the present invention, the at least one flocculating additive A consists of one of the aforementioned cationic polymers. According to one preferred embodiment, the at least one flocculating additive A is cationic starch.

The at least one flocculating additive A can be provided in an aqueous form, e.g., in the form of a water-based solution, or in form of an organic solution, e.g., in an organic solvent selected from the group comprising methanol, ethanol, acetone, and mixtures thereof. However, the at least one flocculating additive A also may be provided in form of an emulsion or a dispersion of water and/or organic solvents, or in form of a mixture of a solution and/or an emulsion and/or a dispersion of water and/or organic solvents.

If the at least one flocculating additive A is provided in form of a solution, the solution is preferably prepared in that the at least one flocculating additive A is added to a solvent, preferably water, having a temperature of at least 50° C., preferably from 50° C. to 100° C., more preferably from 60° C. to 98° C. and most preferably from 70° C. to 96° C. For example, the solution is prepared in that the at least one cationic polymer is added to water having a temperature of from 80° C. to 96° C., like from 90° C. to 96° C. Alternatively, the solution is prepared in that the at least one flocculating additive A is added to a solvent, preferably water, having a temperature of below 50° C., preferably from 5° C. to 49° C., more preferably from 10° C. to 40° C. and most preferably from 15° C. to 30° C.

In one preferred embodiment, a solution of the at least one flocculating additive A is prepared in that the at least one flocculating additive A is added to water at about room temperature, i.e. at 20° C.±2° C.

According to an alternative embodiment, the at least one flocculating additive A is provided in dry form, e.g. in form of a dry powder.

In case the at least one flocculating additive A is provided in the form of a dispersion, the particle size of the flocculating additive A can have a $d_{50}$ value from 10 to 500 nm, preferably from 20 to 100 nm, and more preferably from 25 to 80 nm.

The flocculating additive A may be provided in form of a solution or dry material, preferably in form of a solution having a concentration from 0.5 to 70 wt.-%, preferably from 1 to 25 wt.-%, more preferably from 1.5 to 20 wt.-%, and most preferably from 2 to 10 wt.-%, based on the total weight of the solution.

According to one embodiment of the present invention, the content of the at least one flocculating additive A in the first aqueous suspension S1 is from 0.001 to 20 wt.-%, more preferably from 0.5 to 10 wt.-%, and most preferably from 3 to 5 wt.-%, based on the total weight of the first aqueous suspension S1. According to another embodiment of the present invention, the content of the at least one flocculating additive A in the first aqueous suspension S1 is from 0.001 to 20 wt.-%, more preferably from 0.5 to 10 wt.-%, and most preferably from 3 to 5 wt.-%, based on the total dry weight of the at least one filler material in the first aqueous suspension S1. According to still another embodiment of the present invention, the content of the at least one flocculating additive A in the first aqueous suspension S1 is from 0.001 to 20 wt.-%, more preferably from 0.5 to 10 wt.-%, and most preferably from 3 to 5 wt.-%, based on the total dry weight of the at least one filler material in the aqueous suspension SM.

Flocculating Agent B

According to step ii) of the process according to the present invention, a second aqueous suspension S2 comprises at least one flocculating additive B which is different from flocculating additive A.

The at least one flocculating additive B may be selected from any flocculating additive known in the art, which is different from flocculating additive A and promotes flocculation by causing suspended filler particles to form aggregates called flocs, in combination with another additive, preferably another flocculating additive, and/or with the filler material alone. The at least one flocculating additive B may be selected from anionic, non-ionic, zwitter-ionic, amphoteric, or cationic polymers, or mixtures thereof. According to one embodiment, the at least one flocculating additive A and the at least one flocculating additive B are oppositely charged.

According to a preferred embodiment of the present invention, the at least one flocculating additive B is an anionic polymer, and more preferably a modified polysaccharide.

"Modified polysaccharides" in the meaning of the present invention are polysaccharides, wherein at least a part of the hydroxyl groups is carboxylated. Additionally, the modified polysaccharides may contain other modifications such as aldehyde groups.

Modified polysaccharides according to the present invention may comprise the following structure:

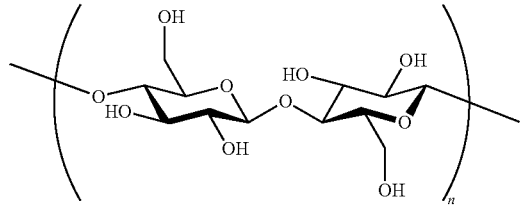

wherein a part of the hydroxyl groups is carboxylated and "n" is indirectly represented by the intrinsic viscosity.

Polysaccharides are polymeric carbohydrate structures, formed of repeating units (at least 10) joined together by glycosidic bonds. Depending on the spatial arrangement of the glycosidic bonds, one may distinguish between α- and β-glycosidic bonds. These structures may be linear, but may also contain various degrees of branching. Polysaccharides may also contain slight modifications of the repeating unit. Exemplary polysaccharides are starch, cellulose, or glycogen, but also structural polysaccharides such as cellulose and chitin.

According to one embodiment of the present invention, the at least one modified polysaccharide has a degree of substitution of the hydroxyl-groups in the range from 0.4 to 2.0, preferably from 0.5 to 1.8, more preferably from 0.6 to 1.6, and most preferably from 0.7 to 1.5.

According to one embodiment of the present invention, the modified polysaccharide is a carboxymethyl derivate and/or a carboxymethyl hydroxypropyl derivate and/or a carboxymethyl hydroxyethyl derivate of a polysaccharide. For example, the modified polysaccharide can be a carboxymethylcellulose (CMC), an anionic starch, an anionic guar, anionic xanthan gum, or mixtures thereof.

According to one embodiment of the present invention, the at least one flocculating additive B is an anionic polymer selected from the group consisting of carboxymethyl cellulose, anionic starch, anionic guar, anionic xanthan gum and/or mixtures thereof.

According to one embodiment of the present invention, the at least one flocculating additive B is carboxymethylcellulose (CMC).

Carboxymethylcellulose (CMC) may be prepared from cellulose by reaction with monochloroacetic acid in the presence of caustic soda to form the sodium salt of carboxymethylcellulose. Each repeating D-glycose unit contains three hydroxyl groups capable of etherification, to give a maximum charge density of three carboxylic groups per monomer unit (i.e. a degree of substitution of three).

The molecular weight and the intrinsic viscosity of the carboxymethylcellulose-based polymer can be adjusted by any method that is known to the person skilled in the art, e.g., by addition of peroxides. Reference is made to DE 1 543 116 A1 describing a method for the preparation of low viscous, water-soluble CMC by oxidative degradation with $H_2O_2$ and to DE 44 11 681 A1 describing the dependency of the degradation of polysaccharide ether on the amount of oxidizing agent, temperature and duration of the treatment.

According to a preferred embodiment of the present invention, the carboxymethylcellulose has an intrinsic viscosity in the range from 5 to 500 ml/g, preferably from 10 to 450 ml/g, more preferably from 50 to 350 ml/g and most preferably from 100 to 200 ml/g.

According to another embodiment of the present invention, the at least one flocculating additive B is an anionic starch.

The anionic starch is preferably chemically modified with anionic groups selected from the group comprising carboxyl groups, carboxymethyl groups, carboxymethyl hydroxypropyl groups, carboxymethyl hydroxyethyl groups, phosphate groups, sulphonate groups and mixtures thereof. The anionic starch can be chosen from amongst the chemically modified starches originating from starches selected from the group comprising wheat starch, corn starch, rice starch, potato starch, tapioca starch, maranta starch, sorghum starch and mixtures thereof. The anionic starch can also be obtained from genetically modified sources comprising amylopectin enriched starches. In one preferred embodiment, the anionic starch is selected from those enriched in amylopectin, that is to say the chemically modified starch is preferably selected from the group consisting of rice starch, potato starch, and mixtures thereof. Methods for preparing such anionic starches are known by the skilled person. The molecular weight of the anionic starch can range from 1 000 to 1 000 000 g/mol and is generally about 220 000 g/mol. The molecular weight of the anionic starch can be adjusted by the treatment with hydrogen peroxide ($H_2O_2$).

According to still another preferred embodiment of the present invention, the at least one flocculating additive B is an anionic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. Additionally or alternatively, a modification of guar may be obtained by etherification of guar with propyleneoxide or ethyleneoxide resulting in a hydroxypropyl guar or hydroxyethyl guar.

According to one embodiment of the present invention, the anionic guar is a carboxymethyl guar (CMG) and/or a carboxymethyl hydroxypropyl guar (CMHPG) and/or a carboxymethyl hydroxyethyl guar (CMHEG). For example, carboxymethyl guar is obtained by reacting a guar with monochloroacetic acid in the presence of caustic soda.

Xanthan gum is a polysaccharide secreted by the bacterium *Xanthomonas campestris* and is typically composed of pentasaccharide repeat units, comprising glucose, mannose, and glucuronic acid. It can be produced by the fermentation of glucose, sucrose, or lactose.

The at least one flocculating additive B may comprise one or more of the aforementioned anionic polymers and one or more further flocculating additives known in the art. According to one embodiment of the present invention, the at least one flocculating additive B is a mixture of two or more of the aforementioned anionic polymers. According to another embodiment of the present invention, the at least one flocculating additive B consists of one of the aforementioned anionic polymers. According to one preferred embodiment, the at least one flocculating additive B is anionic carboxymethyl cellulose.

According to one embodiment of the present invention, the at least one flocculating additive B employed in the process according to the present invention has a pH from 4.5 to 12, preferably from 7 to 11, and more preferably from 8.0 to 10.5.

The at least one flocculating additive B can be provided as solution or dry material. According to a preferred embodiment, the at least one flocculating additive B is in form of an aqueous solution.

According to a preferred embodiment of the present invention, the at least one flocculating additive B is in form of an aqueous solution having a concentration from 1 to 70 wt.-%, preferably from 2 to 55 wt.-%, more preferably from 5 to 50 wt.-%, and most preferably from 30 to 50 wt.-%, based on the total weight of the solution.

If desired, the solution of the at least one flocculating additive B can be concentrated, for example, by ultrafiltration or thermal or drying. Dry flocculating additive B can be produced by thermal drying, preferably by spray drying, and may have a solids content of more than 90 wt.-%, preferably from 95 to 99.9 wt.-%, based on the total weight of the flocculating additive B.

According to one embodiment of the present invention, the content of the at least one flocculating additive B in the second aqueous suspension S2 is from 0.001 to 20 wt.-%, more preferably from 0.1 to 10 wt.-%, and most preferably from 0.2 to 0.8 wt.-%, based on the total weight of the second aqueous suspension S2. According to another embodiment of the present invention, the content of the at least one flocculating additive B in the second aqueous suspension S2 is from 0.001 to 20 wt.-%, more preferably from 0.1 to 10 wt.-%, and most preferably from 0.2 to 0.8 wt.-%, based on the total dry weight of the at least one filler material in the second aqueous suspension S2. According to still another embodiment of the present invention, the content of the at least one flocculating additive B in the second aqueous suspension S2 is from 0.001 to 20 wt.-%, more preferably from 0.1 to 10 wt.-%, and most preferably from 0.2 to 0.8 wt.-%, based on the total dry weight of the at least one filler material in the aqueous suspension SM.

Process for Preparation of Flocculated Filler Particles

According to the present invention a process for the preparation of flocculated filler particles is provided, comprising the steps of a) providing at least two aqueous suspensions each comprising at least one filler material, characterized in that
  i) a first aqueous suspension S1 comprises at least one flocculating additive A, and
  ii) a second aqueous suspension S2 comprises at least one flocculating additive B which is different from flocculating additive A, and
  iii) the at least one filler material in the first aqueous suspension S1 and the second aqueous suspension S2 is different, and
b) combining the at least two aqueous suspensions provided in step a) by bringing them together to form an aqueous suspension SM of flocculated filler particles, wherein the mass ratio of the at least one filler material in the first aqueous suspension and the second aqueous suspension S1:S2 is from 1:100 to 100:1.

According to the present invention, the at least one filler material in the first aqueous suspension S1 and the at least one filler material in the second aqueous suspension S2 are different. Thus, a first aqueous suspension S1 is provided comprising at least one flocculating additive A and at least one first filler material, and a second aqueous suspension S2 is provided comprising at least one flocculating additive B which is different from flocculating additive A, and at least one second filler material.

According to one embodiment, a first aqueous suspension S1 comprising at least one flocculating additive A is prepared by
  A1) providing a first aqueous suspension of the at least one filler material, and
  A2) adding the at least one flocculating additive A to the first aqueous suspension of step A1).

According to another embodiment, a first aqueous suspension S1 comprising at least one flocculating additive A is prepared by
  A1') mixing the at least one flocculating additive A with water, and
  A2') adding the at least one filler material to the first aqueous suspension of step A1').

According to still another embodiment, a first aqueous suspension S1 comprising at least one flocculating additive A is prepared by mixing the at least one filler material, the at least one flocculating additive A and water simultaneously.

According to one embodiment, a second aqueous suspension S2 comprising at least one flocculating additive B is prepared by
  B1) providing a second aqueous suspension of the at least one filler material, and
  B2) adding the at least one flocculating additive B to the second aqueous suspension of step B1).

According to another embodiment, a second aqueous suspension S2 comprising at least one flocculating additive B is prepared by
  B1') mixing the at least one flocculating additive B with water, and
  B2') adding the at least one filler material to the second aqueous suspension of step B1').

According to still another embodiment, a second aqueous suspension S2 comprising at least one flocculating additive B is prepared by mixing the at least one filler material, the at least one flocculating additive B and water simultaneously.

The first aqueous suspension S1 of step i) and/or the second aqueous suspension S2 of step ii) may be mixed in order to distribute the flocculating additive throughout the aqueous suspension more homogeneously. Suitable process equipment for mixing is known to the skilled person and also described below.

The at least one filler material, the at least one flocculating additive A, and the at least one flocculating additive B may be provided in any of the forms described above. In other words, the at least one filler material may be provided in form of a suspension, slurry, dispersion, paste, powder, a moist filter cake or in pressed or granulated form, and the flocculating additives may be provided in form of a solution or in dry form.

The skilled person will provide the at least one flocculating additive A and the at least one flocculating additive B in an amount, which leads to a flocculation of the filler material particles when the first aqueous suspension S1 and the second aqueous suspension S2 are combined. It is appreciated that flocculation of the filler material particles can already take place in the first aqueous suspension S1 and/or the second aqueous suspension S2, before these suspensions are combined. In case that the flocculation occurs with the filler material alone, this flocculation can be distinguished from the flocculation, which occurs after combining step b) of the process of the present invention. For example, the flocs which form after the process step b) may have a different particle size than the flocs generated from one flocculating agent and the mineral filler alone. The flocs which form after the process step b) may be bigger than the flocs generated from one flocculating agent and the mineral filler alone, or, in case, process step b) is carried out under shear, the generated flocs may be smaller than the flocs generated from one flocculating agent and the mineral filler alone.

According to one embodiment of the present invention, the at least one flocculating additive B is provided in an amount such that the content of the at least one flocculating additive A in the first aqueous suspension S1 is from 0.001 to 20 wt.-%, more preferably from 0.5 to 10 wt.-%, and most preferably from 3 to 5 wt.-%, based on the total weight of the first aqueous suspension S1, and/or the at least one flocculating additive B is provided in an amount such that the content of the at least one flocculating additive B in the second aqueous suspension S2 is from 0.001 to 20 wt.-%, more preferably from 0.1 to 10 wt.-%, and most preferably from 0.2 to 0.8 wt.-%, based on the total weight of the second aqueous suspension S2.

According to one embodiment of the present invention, the mass ratio of the at least one flocculating additive A and the at least one flocculating additive B is from 1:50 to 50:1, preferably from 1:30 to 30:1, more preferably from 1:20 to 20:1, even more preferably from 1:10 to 10:1, and most preferably from 1:8 to 8:1. The mass ratios are based on the dry weight of the at least flocculating additive A and the at least one flocculating additive B.

According to step b) of the process according to the present invention, the at least two suspensions provided in step a) are combined by bringing them together, preferably they are combined by bringing them together simultaneously. However, it is within the scope of present invention to combine the aqueous suspension in any order.

The at least two suspensions may be combined by any means known in the art, for example, by pouring, injecting or discharging. For example, the at least two suspensions provided in step a) may be combined by pouring, injecting or discharging them together into another reservoir, vessel or pipe. According to another example, the at least two suspensions provided in step a) may be combined by pouring, injecting or discharging one of the at least two suspensions into the remaining and/or further suspension(s).

The process step b) may be carried out at room temperature, i.e. at 20° C.±2° C., or at other temperatures. According to one embodiment process step b) is carried out at a temperature from 5 to 100° C., preferably from 10 to 80° C., and most preferably from 20 to 65° C. Heat may be introduced by internal shear or by an external source or a combination thereof.

According to one embodiment of the present invention, process step b) is carried out for at least 1 s, preferably for at least 1 min, e.g., for at least 15 min, 30 min, 1 hour, 2 hours, 4 hours, 6 hours, 8 hours, or 16 hours.

According to one embodiment of the present invention, the aqueous suspension SM is sheared during and/or after process step b). "Shearing" in the meaning of the present invention refers to inducing a shear stress within a material, for example, the aqueous suspension SM. By shearing the floc size of the flocculated filler particles may be reduced and a more homogeneous distribution of the particle size of the flocculated filler particles may be obtained. FIG. 3 illustrates a shearing process, wherein larger flocculated filler particles (grey circles) are desaggregated under shear induced by a static mixer into smaller flocs.

The aqueous suspensions SM may be sheared by any method known the skilled person. Examples of suitable shearing methods are shaking, mixing, stirring, agitating, milling, ultrasonication, or inducing a turbulent or laminar flow by means such as baffles or lamellas.

Suitable shearing equipment is known to the skilled person, and may be selected, for example, from stirrers, such as rotor stator systems, blade stirrers, propeller stirrers, turbine stirrers, or anchor stirrers, static mixers such as pipes including baffles or lamellas, mills such as ball mills or impact crushers. According to a preferred embodiment of the present invention, a rotor stator stirrer system is used.

According to one embodiment of the present invention, the aqueous suspension SM is sheared during and/or after process step b) by mixing the aqueous suspension SM of flocculated filler particles. The mixing may be done, e.g. by high speed stirring or agitation. Such agitation or stirring can be carried out continuously or discontinuously. The skilled person will adapt the mixing conditions such as the mixing speed and temperature according to his process equipment. For example, the mixing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time.

Choppers and/or dispersers are used to disperse lumps in a dry operation. Equipment that may be used in the inventive process is available, for example, from Gebrüder Lödige Maschinenbau GmbH, Germany or from Silverson (U.S.A.). Furthermore, a tubular mixing apparatus, for example, from Ystral GmbH, Ballrechten-Dottingen, Germany may be used. Another equipment type that may be used in the inventive process is a MEGATRON® inline homogenizer from Kinematika AG, Switzerland.

According to one embodiment the process is carried out under shear in at least two steps at different shear rates, preferably the first shear rate is lower than the second shear rate. Preferably the first shearing step is carried out during step b) with a shearing rate <1 000 s$^{-1}$. The second shearing step is preferably carried out after process step b). The second shear rate can be from 1 000 to 1 000 000 s$^{-1}$, preferably from 3 000 to 600 000 s$^{-1}$, more preferably from 6 000 to 300 000 s$^{-1}$, and most preferably from 10 000 to 100 000 s$^{-1}$.

According to one embodiment of the present invention, the aqueous suspension SM is sheared during process step b). According to another embodiment of the present invention, the aqueous suspension SM is sheared after process step b). According to still another embodiment of the present invention, the aqueous suspension SM is sheared during and after process step b).

According to a further embodiment of the present invention, the first aqueous suspension S1 and/or the second aqueous suspension S2 provided in step a) of the inventive process are sheared before process step b). The aqueous suspensions may be sheared by any method known the skilled person, and in particular by the methods described above.

According to a further embodiment of the present invention, further aqueous suspensions comprising at least one filler material are provided in process step a). The further aqueous suspensions may comprise the same filler material as the first aqueous suspension S1 or the second aqueous suspension S2 or may comprise at least one different filler material. Optionally, the further aqueous suspensions may comprise at least one flocculating additive, which may be selected from the at least one flocculating additive A and/or the at least one flocculating additive B described above. For example, a third aqueous suspension S3 comprising at least one filler material may be provided in process step a), which comprises the same material as the first aqueous suspension S1 or the second aqueous suspension S2 or may comprise a different filler material. Furthermore, the third aqueous suspension S3 may comprise at least one flocculating additive which may be selected from the at least one flocculating additive A and/or the at least one flocculating additive B described above.

According to one embodiment of the present invention, the Brookfield viscosity of the first aqueous suspension S1 and/or the second aqueous suspension S2 and/or the aqueous suspension SM is less than 5 000 mPa·s at 25° C., preferably less than 1 000 mPa·s at 25° C., and more preferably between 10 and 200 mPa·s at 25° C.

According to a preferred embodiment, the Brookfield viscosity of the first aqueous suspension S1, the second aqueous suspension S2, and the aqueous suspension SM is less than 5 000 mPa·s at 25° C., preferably less than 1 000 mPa·s at 25° C., and more preferably between 10 and 200 mPa·s at 25° C. According to one embodiment, the aqueous suspension SM of flocculated filler materials has a Brookfield viscosity from 1 to 1000 mPa·s at 25° C., more preferably from 5 and 800 mPa·s at 25° C., and most preferably from 10 and 600 mPa·s at 25° C. According to one embodiment, the Brookfield viscosity is measured at 100 rpm. The viscosity of the first aqueous suspension S1 and/or the second aqueous suspension S2 and/or the aqueous suspension SM may be adjusted by the addition of a solvent, preferably water.

The solids content of the aqueous suspension SM can be adjusted by the methods known to the skilled person. To adjust the solids content of an aqueous suspension, the suspension may be partially or fully dewatered by a filtration, centrifugation or thermal separation process. For example, the suspensions may be partially or fully dewatered by a filtration process such as nanofiltration or a thermal separation process such as an evaporation process. Alternatively, water may be added to the solid material (e.g. resulting from filtration) until the desired solids content is obtained. Additionally or alternatively, a flocculated filler particle suspension or other filler particle suspension having an appropriate lower content of solid particles may be added to the aqueous suspension SM until the desired solids content is obtained. The additionally added flocculated filler particle suspension or other filler particles suspensions can be dispersed or undispersed.

According to one embodiment of the present invention, the solids content of the aqueous suspension SM obtained after process step b) is from 1 to 75 wt.-%, preferably from 2 to 60 wt.-%, and most preferably from 5 to 35 wt.-%, based on the total weight of the aqueous suspension SM.

Process step b) can be carried out in form of a batch process, a semi-continuous or a continuous process.

As shown in FIG. 1, a batch process may comprise of a first vessel (1), a second vessel (2), and a mixing vessel (3). The first vessel (1) may contain a first aqueous suspension (4) containing at least one first filler material. The second vessel (2) may contain a second aqueous suspension (5) containing at least one second filler material, which is different to that included in the first vessel (1). At least one flocculating additive A (6) may be added to the first vessel (1) and mixed with the first aqueous suspension (4) containing at least one first filler material. At least one flocculating additive B (7) may be added to the second vessel (2) and mixed with the second aqueous suspension (5) containing at least one second filler material. The obtained mixtures may then be combined by discharging them simultaneously into the mixing vessel (3).

In a continuous process the desired amount of the first flocculating additive A may be injected into a first pipe containing a first aqueous suspension containing at least one first filler material, and the desired amount of the second flocculating additive B may be injected into a second pipe containing a second aqueous suspension containing at least one second filler material which is different to that included in the first pipe. The first and the second pipe may be of a length sufficient to permit adequate mixing of the at least one filler material and the flocculating additives and/or may comprise an in-line static mixer. The first and the second suspensions may be pumped and injected simultaneously to a third pipe, wherein the first and the second suspensions are combined.

According to one embodiment of the present invention, the flocculated filler particles obtained by process step b) are characterized in that they have a volume determined median particle diameter $d_{50}$ from 0.1 to 500 µm, preferably from 0.2 to 200 µm, more preferably from 0.5 to 150 µm, and most preferably from 1.0 to 100 µm. According to another embodiment of the present invention, the flocculated filler particles obtained by process step b) are characterized in that they have a volume determined median particle diameter $d_{50}$ from 0.1 to 70 µm, preferably from 0.2 to 50 µm, more preferably from 0.5 to 30 µm, and most preferably from 1.0 to 15 µm.

According to the present invention a process for the preparation of flocculated filler particles is provided, comprising the steps of
  a) providing at least two aqueous suspensions each comprising at least one filler material, characterized in that
    i) a first aqueous suspension S1 comprises at least one flocculating additive A, and
    ii) a second aqueous suspension S2 comprises at least one flocculating additive B which is different from flocculating additive A, and
    iii) the at least one filler material in the first aqueous suspension S1 and the second aqueous suspension S2 is different, and
  b) combining the at least two aqueous suspensions provided in step a) by bringing them simultaneously together to form an aqueous suspension SM of flocculated filler particles, wherein the mass ratio of the at least one filler material in the first aqueous suspension and the second aqueous suspension S1:S2 is from 1:100 to 100:1, and
    wherein the at least one filler material is selected from a calcium carbonate-comprising material, preferably ground calcium carbonate and/or precipitated calcium carbonate, and/or clay,
    the at least one flocculating additive A is a cationic starch, and
    the at least one flocculating additive B is a carboxymethyl cellulose.

Preferably, the at least one filler material in the first aqueous suspension S1 is selected from a calcium carbonate-comprising material, preferably ground calcium carbonate, and the at least one filler material in the second aqueous suspension S2 is selected from precipitated calcium carbonate and/or clay, the at least one flocculating additive A is a cationic starch, and the at least one flocculating additive B is a carboxymethyl cellulose. According to a preferred embodiment, in process step a) two aqueous suspensions each comprising at least one filler material are provided. In addition or alternatively, the content of the at least one flocculating additive A in the first aqueous suspension S1 is preferably from 0.0001 to 20 wt.-%, based on the total weight of the first aqueous suspension S1, and/or the content of the at least one flocculating additive B in the second aqueous suspension S2 is preferably from 0.0001 to 20 wt.-%, based on the total weight of the second aqueous suspension S2. In addition or alternatively, the content of the at least one filler material in the first aqueous suspension S1 is preferably from 10 to 40 wt.-%, based on the total weight of the first aqueous suspension S1, and/or the content of the at least one filler material in the second aqueous suspension S2 is preferably from 10 to 40 wt.-%, based on the total weight of the second aqueous suspension S2. In addition or alternatively, the solids content of the aqueous suspension SM obtained after process step b) is preferably from 5 to 35 wt.-%, based on the total weight of the aqueous suspension SM.

The Flocculated Filler Particles

According to another aspect of the present invention, a flocculated filler particle suspension obtained by a process according to the present invention is provided, characterized in that the filler particles have a mono-modal particle size distribution and/or a volume defined particle size polydispersity expressed as full width at half maximum height (FWHM) of less than 45 µm and/or a volume determined median particle size ($d_{50}$) in the range from 5 to 50 µm.

According to still another aspect of the present invention, a flocculated filler particle suspension is provided, characterized in that the filler particles have a mono-modal particle size distribution and/or a volume defined particle size polydispersity expressed as full width at half maximum height (FWHM) of less than 45 µm and/or a volume determined median particle size ($d_{50}$) in the range from 5 to 50 µm.

According to one embodiment the volume determined median particle size ($d_{50}$) is from 10 to 30 µm, and preferably from 15 to 25 µm.

According to one embodiment of the present invention, the flocculated filler particles have a volume defined particle size polydispersity expressed as full width at half maximum height (FWHM) of less than 35 µm, preferably less than 30 µm, more preferably less than 20 µm, and most preferably less than 10 µm. According to another embodiment of the present invention, the flocculated filler particles have a volume defined particle size polydispersity expressed as full width at half maximum height (FWHM) from 0.01 to 35 µm, preferably from 0.1 to 30 µm, more preferably from 1 to 20 µm, and most preferably from 5 to 10 µm. As already defined above, in case that the particle size distribution is not mono-modal, the full width at half maximum height (FWHM) relates to the main peak of the particle size distribution, i.e. the peak of the particle size distribution having the largest area under the curve.

The inventors of the present invention surprisingly found that by mixing the at least one filler material with each flocculating additive separately, and combining the filler material/flocculating additive mixtures afterwards, a more homogeneous or unitary mixture of filler material and flocculating additives can be achieved. This in turn can result in a more homogeneous particle size distribution of the flocculated filler particles, which may be reflected by a narrow mono-modal distribution of the particle size or, in case that the particle size distribution is not mono-modal, may be reflected by the absence of particle populations having a smaller volume determined median particle size ($d_{50}$) than the main peak of the particle size distribution, i.e. the peak having the largest area under the curve.

Preferred flocculated filler particle suspensions are obtained by using S-PCC as first filler material and GCC as second filler material, GCC as first filler material and S-PCC as second filler material, clay as first filler material and GCC as second filler material, clay as first filler material and S-PCC as second filler material, aragonitic PCC as first filler material and S-PCC as second filler material or clay as first filler material and GCC as second filler material. It is preferred to add carboxymethyl cellulose as flocculating additive A to the first filler material and starch as flocculating additive B to the second filler material. A preferred ratio between carboxymethyl cellulose and starch is 1:8.

Furthermore, the inventors surprisingly found that paper products prepared from the flocculated filler particle suspension of the present invention exhibit an improved strength, and also allow the production of papers with high content of filler material. Another advantage is that the physical and optical properties of the papers prepared from the invention suspension are not impaired to any substantial degree compared to papers produced by conventional processes.

According to a further aspect of the present invention, a process for the preparation of a fleece comprising the steps a) and b) of the process according to the present invention is provided, characterized in that the aqueous suspension SM of flocculated filler particles obtained after process step b) is combined in a further step c) with synthetic and/or natural fibres, and the resulting suspension SMF is subjected to a dewatering step d) to obtain a fleece. The aqueous suspension SM of flocculated filler particles can be combined with dry synthetic and/or natural fibres or with an aqueous suspension of these fibres, preferably with an aqueous suspension and most preferably with an aqueous suspension of natural fibres. The content of flocculated filler particles and synthetic or natural fibres in the aqueous suspension during step c) can be between 0.1 and 5 wt.-%, preferably between 0.5 and 3 wt.-% and most preferably about 1 wt.-%, based on the total weight of the aqueous suspension. According to one embodiment, the mass ratio of the flocculated filler particles and the synthetic and/or natural fibres is between 1:4 and 1:1, preferably between 1:2 and 1:1. Preferably, the process step c) is carried out in the head box of a paper machine.

According to one embodiment of the present invention, the fleece is paper, cardboard, or containerboard, and preferably a sheet of paper.

The synthetic and/or natural fibres may be selected from any fibres suitable for papermaking known in the art. Examples of synthetic fibres are nylon, polyester, or acrylic fibres. Examples of natural fibres are cellulose pulp derived from wood, rags, grasses, or agricultural wastes.

The skilled person may carry out the dewatering step by any means known in the art. According to one embodiment the dewatering step d) is carried out on a screen, preferably via a head box of a paper machine.

According to a further aspect of the present invention, a fleece, preferably a sheet of paper, obtained by steps a) to d) of the afore-mentioned process is provided.

According to one embodiment the fleece is a sheet of paper having a paper weight of 30 to 500 g/m², preferably of 50 to 200 g/m², and more preferably 80 to 150 g/m². According to one exemplary embodiment, the sheet of paper is a copy paper.

The obtained fleece may have a filler content from 0.1 to 80 wt.-%, based on the total weight of the fleece, preferably from 1 to 60 wt.-%, more preferably from 5 to 40 wt.-%, and most preferably from 10 to 30 wt.-%.

According to a further aspect of the present invention, a use of a flocculated filler particle suspension according to the present invention in paper coating and/or paper wet end applications, preferably in high filler load paper wet end applications, or for cigarette paper is provided.

The scope and interest of the invention will be better understood based on the following figures and examples which are intended to illustrate certain embodiments of the invention and are non-limitative.

EXPERIMENTS

1. Measuring Methods

Figure 1:
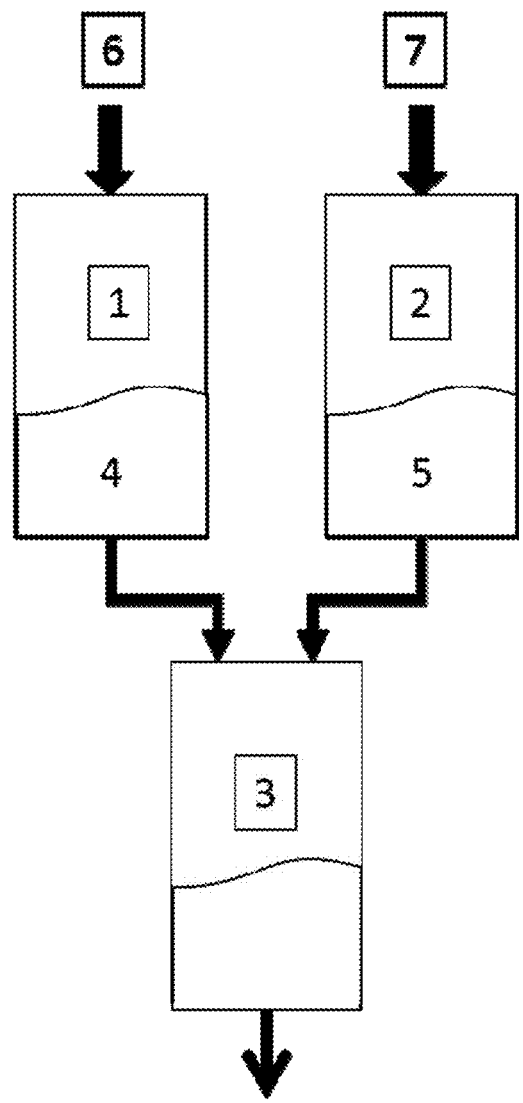
FIG. 1 shows an example of a batch process of the present invention.

In the following the measurement methods implemented in the examples are described.

Particle Size Distribution (PSD) of the Employed Filler Materials Before Step a)

The particle size distribution of the products was measured using a Malvern Mastersizer 2000 Laser Diffraction System (Malvern Instruments Plc., Great Britain) using the Fraunhofer light scattering approximation. The method and instrument are known to the skilled person are commonly used to determine particle sizes of fillers and other particulate materials.

The measurement was carried out in an aqueous solution comprising 0.1 wt.-% $Na_4P_2O_7$. The samples were dispersed using a high speed stirrer and in the presence of supersonics.

Particle Size Distribution (PSD) of the Filler Particles in Suspension S1, S2 and SM The particle size distribution of the products was measured using a Malvern Mastersizer 2000 Laser Diffraction System (Malvern Instruments Plc., Great Britain) using the Fraunhofer light scattering approximation. The method and instrument are known to the skilled person are commonly used to determine particle sizes of fillers and other particulate materials.

The measurement was carried out in an aqueous solution comprising 0.1 wt.-% $Na_4P_2O_7$. The samples were dispersed using a high speed stirrer and in the absence of supersonics.

Full Width at Half Maximum Height (FWHM)

The particle size distribution data were displayed in an xy scatter diagram and the data were arranged accordingly in x and y columns whereas the size data were put in the x-column and the frequency data was arranged in the y column. The maximum height ($y_m$) was determined by sorting the particle size distribution curve by the frequency data points. The respective x-value was then defined as the peak position at the maximum height ($x_m$). By dividing the maximum peak height by 2, the half maximal height was obtained ($y_{m0.5}$).

The four data points that have the closest y-value compared to the half maximum height value were defined, whereas, compared to the data point of the half maximal height at the position of the maximal height $P_{HM2}$ ($x_m/y_{m0.5}$):

$P_{IL}$ was the data point having the nearest lower x- and the nearest lower y-value ($x_{1L}/y_{1L}$). $P_{1H}$ was the data point having the nearest lower x- and the nearest higher y-value ($x_{1H}/y_{1H}$). $P_{2L}$ was the data point having the nearest higher x- and the nearest lower y-value ($x_{2L}/y_{2L}$). $P_{2H}$ was the data point having the nearest higher x- and the nearest higher y-value ($x_{2H}/y_{2H}$).

The linearly interpolated x-positions ($x_{1I}$ and $x_{2I}$) of the data points having the y-value of the half of maximal height value ($y_{m2}$) were linearly interpolated as follows:

$$x_{1I} = x_{1L} + \left(\frac{y_{m0.5} - y_{1L}}{y_{1H} - y_{1L}}\right)(x_{1H} - x_{1L})$$

$$x_{2I} = x_{2H} + \left(\frac{y_{2H} - y_{m0.5}}{y_{2L} - y_{2H}}\right)(x_{2L} - x_{2H}) \text{ and}$$

$$FHMW = x_{2I} - x_{1I}.$$

Filler Content

The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet.

Mechanical Strength Properties

Breaking length and tensile energy have been determined according to EN ISO 1924-2 and the internal bond has been determined according to DIN 54516.

2. Materials

Filler material 1 (P1): undispersed, scalenohedral precipitated calcium carbonate ($d_{50}$=4.3 µm, measured with Malvern Mastersizer 2000), commercially available from Omya AG, Switzerland.

Filler material 2 (P2): Undispersed, aragonitic precipitated calcium carbonate ($d_{50}$=4 µm, measured with Malvern Mastersizer 2000), commercially available from Omya AG, Switzerland.

Filler material 3 (P3): Selected, natural ground calcium carbonate (marble), dispersed product (Hydrocarb 60 ME), commercially available from Omya AG, Switzerland. P3 is microcrystalline, has a rhombohedral particle shape of high fineness, and was used as pre-dispersed slurry having a solids content of 78 wt.-%.

Filler material 4 (P4): Clay (Intramax 50, $d_{50}$=7 µm, measured by Mastersizer 2000), powder form, commercially available from Imerys International Ltd, UK.

Flocculating additive 1 (FA1): Carboxymethyl cellulose (Finnfix 10, $M_W$=60000 g/mol, degree of substitution=0.8), commercially available from CP Kelko, USA.

Flocculating additive 2 (FA2): Starch powder (C*Bond HR 35845), commercially available from Cargill, USA.

3. Examples

Example 1—Preparation of Stock Solutions of Flocculating Additives

A stock solution of FA1 was prepared by adding FA1 into tap water at a temperature of 23° C. under stirring. Stirring was continued for 60 minutes until FA1 had completely dissolved. FA1 was added in such an amount that a solution with a FA1 content of 4 wt.-%, based on the total weight of the FA1 solution, was obtained.

A stock solution of FA2 was prepared by adding FA2 into deionized water and heating the mixture for 30 minutes at 100° C. FA2 was added in such an amount that a solution with a FA2 content of 1 wt.-%, based on the total weight of the FA2 solution, was obtained. The FA2 solution was cooled down to room temperature using a water bath and the amount of water lost by evaporation was added to readjust the solution to a FA2 content of 1 wt.-%, based on the total weight of the FA2 solution.

Example 2—Preparation of Flocculated Filler Particles (Inventive Example)

A first aqueous suspension S1 was prepared by adding the amount of the FA1 stock solution indicated in Table 1 below to a solution of a first filler material under stirring at room temperature. The amount of FA1 was chosen to obtain an overall FA1 content of 0.5 pph (parts per hundred on dry pigment) in the final aqueous suspension SM of flocculated filler particles.

A second aqueous suspension S2 was prepared by adding the amount of the FA2 stock solution indicated in Table 1 below to a solution of a second filler material under stirring at room temperature. The amount of FA2 was chosen to obtain an overall FA2 content of 4.0 pph (parts per hundred on dry pigment) in the final aqueous suspension SM of flocculated filler particles. During the addition of the FA2 solution flocculated filler particles formed.

The first aqueous suspension S1 and the second aqueous suspension S2 were combined at room temperature in a separate vessel by pouring both suspensions simultaneously into the vessel under stirring, whereby flocculated filler particles formed in the suspension. After complete addition the resulting mixture was stirred for additional 5 minutes at a shear rate of 50 s$^{-1}$. Then the slurry was subjected for 15 minutes to a Megatron treatment for disaggregation of the flocs at a shear rate of 40 000 s$^{-1}$ (Megatron MT 5000 with MTO 5000 Q working chamber, Kinematica AG, Luzern CH, circulation mode, 14 000 rpm).

The employed amounts and types of filler materials and the amounts of the employed flocculating additives are compiled in Table 1 below.

TABLE 1

Composition of prepared aqueous flocculated filler particle suspensions.

| Sample | First filler material | Second filler material | Ratio first filler material/second filler material dry/dry [wt.-%] | Amount of FA1 in S1 [pph$^a$] | Amount of FA2 in S2 [pph$^a$] |
|---|---|---|---|---|---|
| 1 | P3 | P1 | 90/10 | 0.56 | 40 |
| 2 | P3 | P1 | 10/90 | 5 | 4.4 |
| 3 | P3 | P1 | 50/50 | 1 | 8 |
| 4 | P1 | P3 | 50/50 | 1 | 8 |
| 5 | P4 | P3 | 50/50 | 1 | 8 |
| 6 | P4 | P1 | 50/50 | 1 | 8 |
| 7 | P2 | P1 | 10/90 | 5 | 4.4 |
| 8 | P4 | P3 | 70/30 | 0.7 | 13.3 |

$^a$Parts per hundred based on dry filler material.

For every sample, the volume determined median particle size ($d_{50}$) of the flocculated filler particles, the particle size distribution thereof as well as the position of the main peak of the particle size distribution, main peak share i.e. the content of the area under the main peak in relation to the content of the sum of the area of all existing peaks, the main peak height, the main peak half height, and the FWHM values were measured. The results are given in Table 2 below.

TABLE 2

Properties of flocculated filler particles.

| Sample | $d_{50}$ [µm] | Main peak position [µm] | Main peak share [%] | Main peak height [%] | Main peak half height [%] | FWHM [µm] |
|---|---|---|---|---|---|---|
| 1 | 21.8 | 22.9 | 96.4 | 8.0 | 4.0 | 40.7 |
| 2 | 8.3 | 10.0 | 91.7 | 10.0 | 5.0 | 12.8 |
| 3 | 13.5 | 15.1 | 93.9 | 9.2 | 4.6 | 22.9 |
| 4 | 11.9 | 13.2 | 93.6 | 9.7 | 4.8 | 19.4 |
| 5 | 14.7 | 17.4 | 100.0 | 8.1 | 4.1 | 28.6 |
| 6 | 11.2 | 13.2 | 100.0 | 8.7 | 4.3 | 19.8 |
| 7 | 7.8 | 8.7 | 90.5 | 9.8 | 4.9 | 12.2 |
| 8 | 10.2 | 11.2 | 100 | 10.4 | 5.2 | 15.3 |

Figure 2:
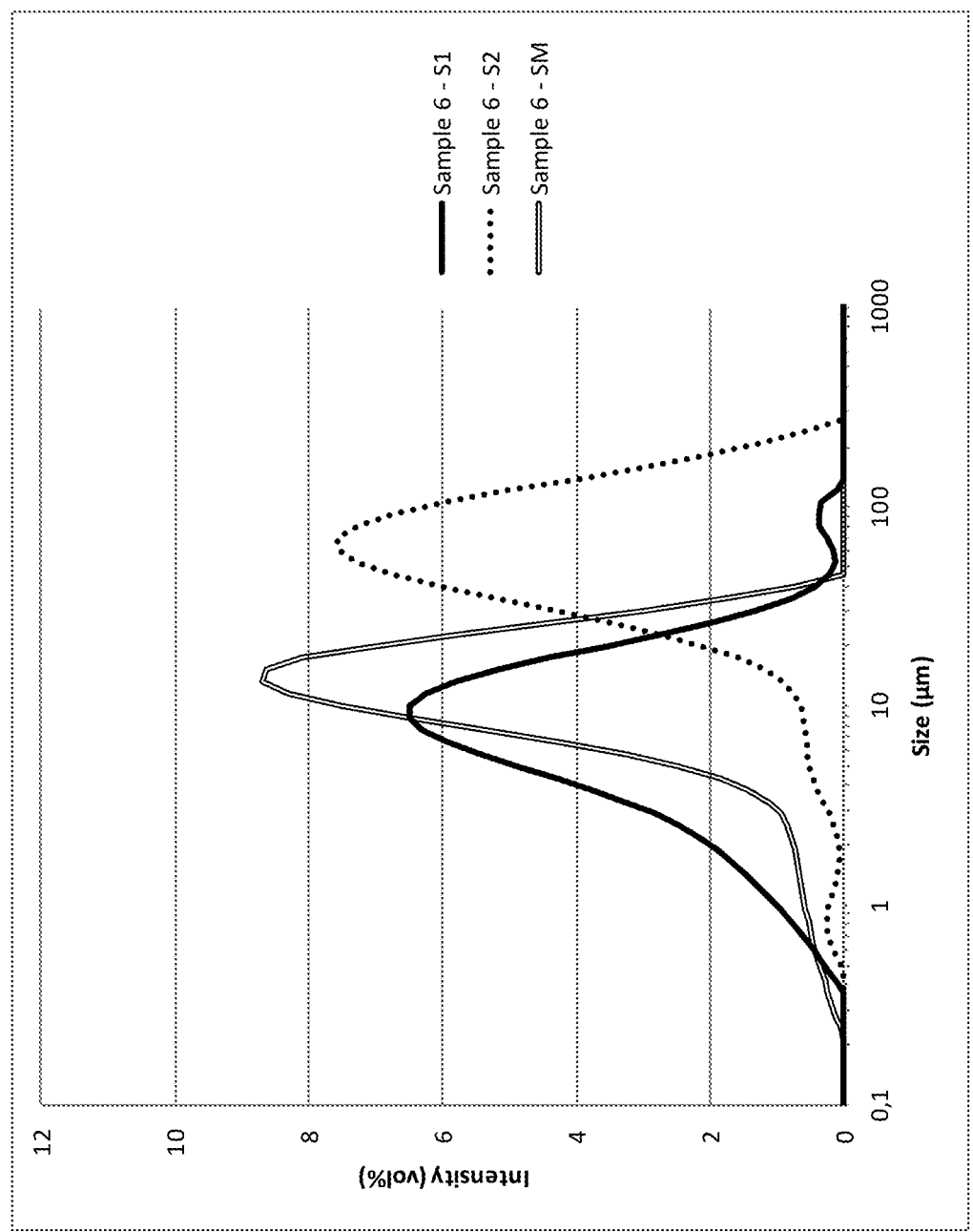
FIG. 2 shows the particle size distribution of filler particles according to example 2 (sample 6).
Figure 3:
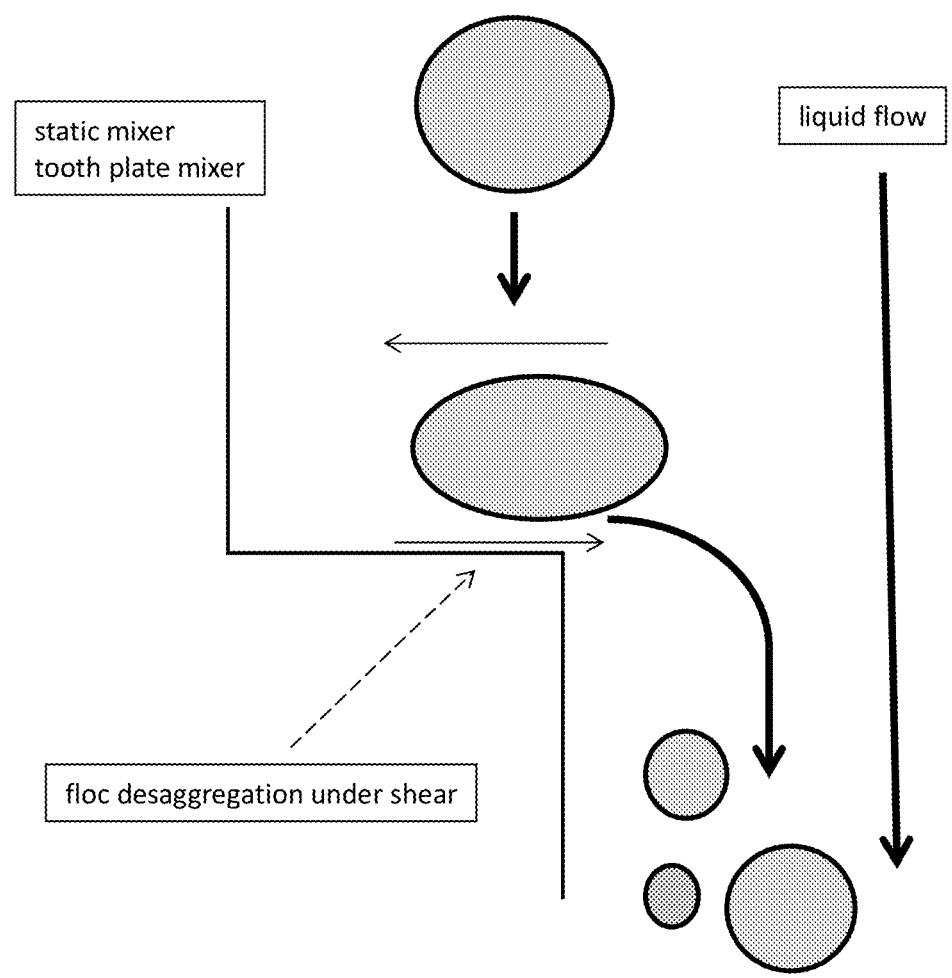
FIG. 3 illustrates floc desaggregation under shear using a static mixer.

FIG. 2 shows the particle size distributions of a first aqueous suspension S1 including the filler material P1 and a second aqueous suspension S2 including the filler material P5 (see sample 6, Table 1). It can be gathered from said figure that the flocculation that occurred in the second aqueous suspension S2 during the addition of flocculating additive FA2 resulted in an increased size of the filler particles. The particle size of P5 in the first aqueous suspension S1 did not change at all after addition of the flocculating additive FA1. After combining the first and second aqueous suspensions the flocculated filler particle suspension obtained according to Example 2 (sample 6) had a FWMH of <20 µm, which means that a very homogenous particle size distribution of the first and second filler material is obtained. Thus, Example 2 (sample 6) confirms that the process of the present invention allows to manufacture flocculated fillers having a homogenous and mono-modal particle size distribution in the meaning of the present invention.

Example 3—Preparation of Flocculated Filler Particles (Comparative Example)

A first filler material and a second filler material indicated in Table 3 below were mixed by adding the first filler material to the second filler material under stirring at room temperature. The resulting mixture FM was stirred for additional 5 minutes at a shear rate of 50 s$^{-1}$. Then, the amount of FA1 stock solution indicated in Table 3 below was added to this mixture under stirring at room temperature. The resulting mixture FM1 was stirred for additional 5 minutes at a shear rate of 50 s$^{-1}$. Then, the amount of FA2 stock solution indicated in Table 3 below was added to this mixture under stirring at room temperature, whereby flocculated filler particles formed in suspension. After complete addition, the resulting mixture was stirred for additional 5 minutes at a shear rate of 50 s$^{-1}$. Then the slurry was subjected for 15 minutes to a Megatron treatment for disaggregation of the flocs at a shear rate of 40 000 s$^{-1}$ (Megatron MT 5000 with MTO 5000 Q working chamber, Kinematica AG, Luzern CH, circulation mode, 14 000 rpm).

TABLE 3

Composition of prepared aqueous flocculated filler particle suspensions.

| Sample | First filler material | Second filler material | Ratio first filler material/second filler material dry/dry [wt.-%] | Amount of FA1 in FM [pph[a]] | Amount of FA2 in FM [pph[a]] |
|---|---|---|---|---|---|
| 9 | P3 | P1 | 10/90 | 0.5 | 4 |
| 10 | P4 | P3 | 70/30 | 0.5 | 4 |

[a]Parts per hundred based on dry filler material.

Example 4—Preparation and Testing of Handsheets 60 g (dry) pulp were diluted in 10 dm$^3$ tap water, and then the filler to be tested was added in an amount so as to obtain the overall filler content based on the final paper weight. The suspension was stirred for 30 minutes. Subsequently, 0.06% (based on dry weight) of a polyacrylamide (Polymin 1530, commercially available from BASF, Germany) was added as a retention aid and sheets of 80 g/m$^2$ were formed using the Rapid-Köthen hand sheet former. Each sheet was dried using the Rapid-Köthen drier. The composition of the handsheets is given in Table 4 below.

TABLE 4

Composition of handsheets.

| Handsheet Sample | Pulp [wt.-%] | FM of Example 3- Sample 9 [wt.-%] | FM of Example 3- Sample 10 [wt.-%] | Flocculated filler of Example 3- Sample 9 [wt.-%] | Flocculated filler of Example 3- Sample 10 [wt.-%] | Flocculated filler of Example 2- Sample 2 [wt.-%] | Flocculated filler of Example 2- Sample 8 [wt.-%] |
|---|---|---|---|---|---|---|---|
| 1 (c) | 80 | — | 20 | — | — | — | — |
| 2 (c) | 75 | — | 25 | — | — | — | — |
| 3 (c) | 80 | — | — | — | 20 | — | — |
| 4 (c) | 75 | — | — | — | 25 | — | — |
| 5 (i) | 80 | — | — | — | — | — | 20 |
| 6 (i) | 75 | — | — | — | — | — | 25 |
| 7 (c) | 80 | 20 | — | — | — | — | — |
| 8 (c) | 75 | 25 | — | — | — | — | — |
| 9 (c) | 80 | — | — | 20 | — | — | — |
| 10 (c) | 75 | — | — | 25 | — | — | — |
| 11 (i) | 80 | — | — | — | — | 20 | — |
| 12 (i) | 75 | — | — | — | — | 25 | — |

(i) = inventive; (c) = comparative.

The mechanical properties of the prepared Handsheet Samples 1 to 12 were tested, in particular the tensile energy, the breaking length and the internal bond have been determined. The results are shown in FIGS. 4, 5 and 6.

Figure 4:
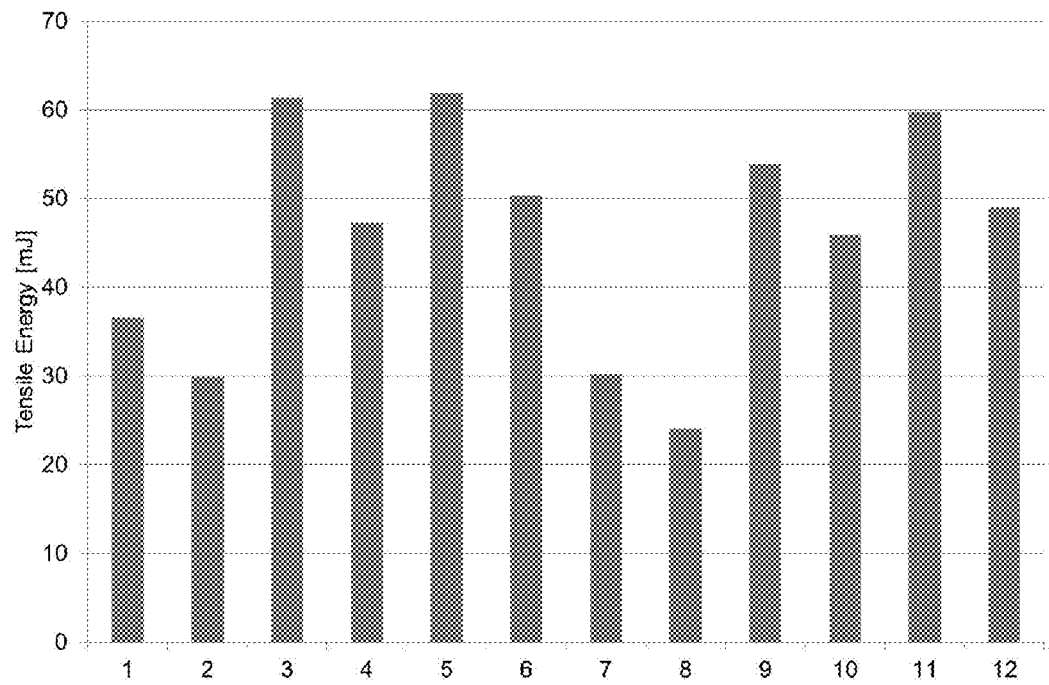
FIG. 4 illustrates the tensile energy of Handsheet Samples 1 to 12.

As can be gathered from FIG. 4, the flocculation of the filler particle mixture (Example 3) leads to an increased tensile energy in hand sheets (compare Handsheet Sample 3 to 1, 4 to 2, 9 to 7 and 10 to 8). However, if the flocculation is done according to the present invention (Example 2), the tensile energy increases even further (compare Handsheet Sample 5 to 3, 6 to 4, 11 to 9 and 12 to 10).

Figure 5:
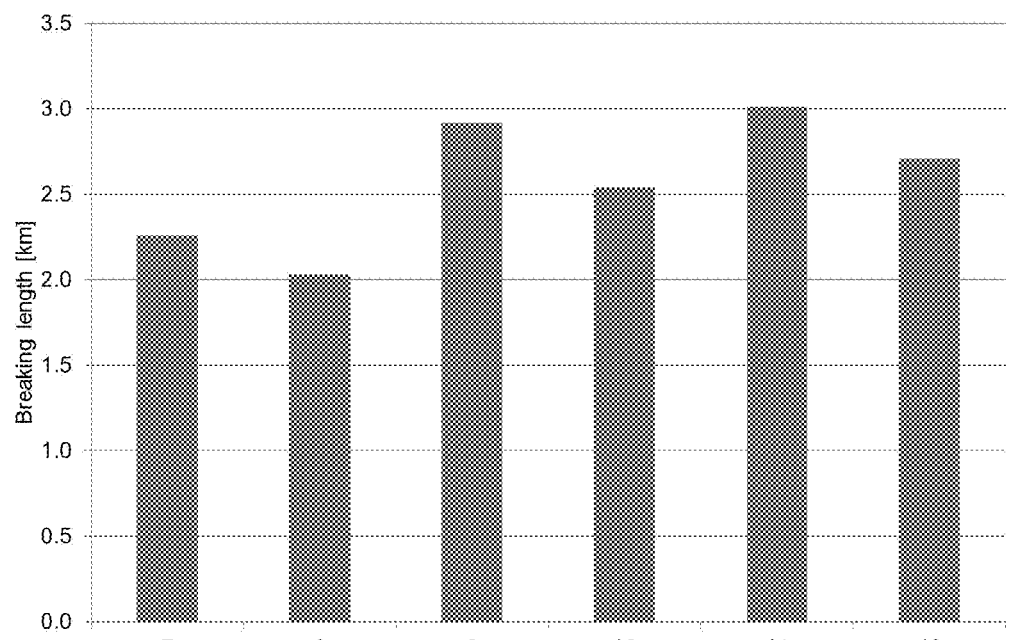
FIG. 5 shows the breaking length of Handsheet Samples 7 to 12.

FIG. 5 reveals also that the breaking length of hand sheets containing flocculated filler mixtures (Handsheet Sample 9 and 10) is increased compared to the filler mixture alone (compare Handsheet Sample 9 to 7 and 10 to 8). An even higher increase in breaking length can be seen for flocculated filler containing hand sheets where the filler mixture was flocculated according to the present invention (compare Handsheet Sample 11 to 9 and 12 to 10).

Figure 6:
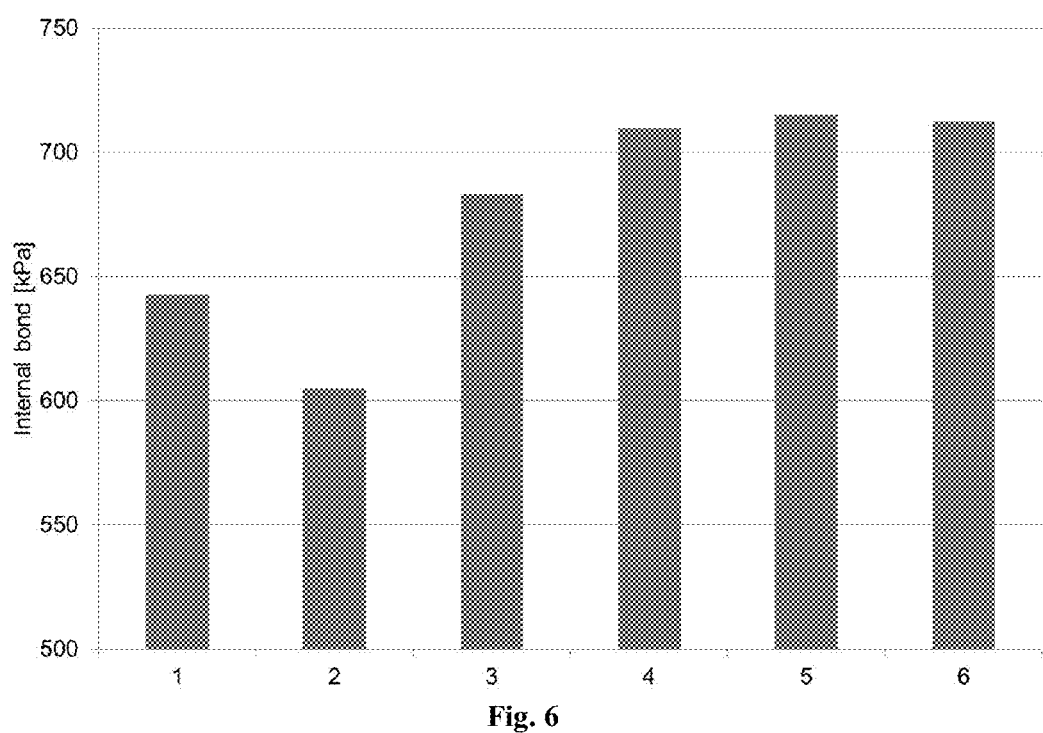
FIG. 6 illustrates the internal bond of Handsheet Samples 1 to 6.

The flocculation of particle filler mixtures also increases the internal bond of hand sheets containing such fillers, compared to hand sheets containing the filler mixtures alone as can be seen in FIG. 6 (compare Handsheet Sample 3 to 1 and 4 to 2). When the filler is flocculated according to the present invention, the internal bond of hand sheets containing such flocculated filler is increased even more (compare Handsheet Sample 5 to 3 and 6 to 4).

The invention claimed is:

1. A process for the preparation of flocculated filler particles comprising:
   providing at least one first aqueous suspension S1 in a first vessel that comprises at least one flocculating additive A and at least one first filler material;
   providing at least one second aqueous suspension S2 in a second vessel that comprises at least one flocculating additive B and at least one second filler material, wherein the at least one flocculating additive B is different from the at least one flocculating additive A, wherein the at least one first filler material in the first aqueous suspension S1 and the at least one second filler material in the second aqueous suspension S2 are different; and
   combining the at least one first aqueous suspension S1 with the at least one second aqueous suspension S2 simultaneously in a third vessel, under conditions effective to form a mixture, the mixture comprising an aqueous suspension SM of flocculated filler particles.

2. The process according to claim 1, wherein a Brookfield viscosity of the first aqueous suspension S1 and/or the second aqueous suspension S2 and/or the aqueous suspension SM is less than 5,000 mPa·s at 25° C.

3. The process according to claim 1, wherein a Brookfield viscosity of the first aqueous suspension S1 and/or the second aqueous suspension S2 and/or the aqueous suspension SM is less than 1,000 mPa·s at 25° C.

4. The process according to claim 1, wherein a Brookfield viscosity of the first aqueous suspension S1 and/or the second aqueous suspension S2 and/or the aqueous suspension SM is between 10 and 200 mPa·s at 25° C.

5. The process according to claim 1, wherein the at least one flocculating additive A is a cationic polymer selected from the group consisting of cationic starch, polyamines, polyethyleneimines, polyacrylamides, cationic amine amide, epichlorohydrin resins, polydiallyldimethylammonium chloride, cationic guar, and any mixture thereof.

6. The process according to claim 1, wherein the at least one flocculating additive A is a cationic starch.

7. The process according to claim 1, wherein the at least one flocculating additive B is an anionic polymer selected from the group consisting of carboxymethyl cellulose, anionic starch, anionic guar, anionic xanthan gum, and any mixture thereof.

8. The process according to claim 1, wherein the at least one flocculating additive B is an anionic carboxymethyl cellulose.

9. The process according to claim 8, wherein the at least one flocculating additive A is a cationic starch.

10. The process according to claim 9, wherein the at least one first filler material in the first suspension S1 is ground calcium carbonate and the at least one second filler material in the second suspension S2 is precipitated calcium carbonate.

11. The process according to claim 1, wherein the aqueous suspension SM is sheared during and/or after simultaneous combination of the at least two aqueous suspensions.

12. The process according to claim 1, wherein the aqueous suspension SM is sheared in at least two steps at different shear rates.

13. The process according to claim 1, wherein the aqueous suspension SM is sheared in at least two steps at different shear rates, wherein the first shear rate is lower than the second shear rate.

14. The process according to claim 1, wherein the at least one first filler material and the at least one second filler material are selected from the group consisting of a calcium carbonate-comprising material, ground calcium carbonate, precipitated calcium carbonate, modified calcium carbonate, talc, clay, dolomite, marble, titanium dioxide, kaolin, silica, alumina, mica, aluminium trihydrate, magnesium hydroxide, plastic pigments, a hybrid material comprising an organic filler and an inorganic chemical composition, and any mixture thereof.

15. The process according to claim 1, wherein the at least one first filler material in the first suspension S1 is ground calcium carbonate and the at least one second filler material in the second suspension S2 is precipitated calcium carbonate and/or clay.

16. The process according to claim 1, wherein the at least one first filler material in the first suspension S1 is ground calcium carbonate and the at least one second filler material in the second suspension S2 is precipitated calcium carbonate.

17. The process according to claim 1, wherein the content of the at least one flocculating additive A in the first aqueous suspension S1 is from 0.5 to 10 wt.-%, based on the total weight of the first aqueous suspension S1, and/or the content of the at least one flocculating additive B in the second aqueous suspension S2 is from 0.1 to 10 wt.-%, based on the total weight of the second aqueous suspension S2.

18. The process according to claim 1, wherein the content of the at least one flocculating additive A in the first aqueous suspension S1 is from 3 to 5 wt.-%, based on the total weight of the first aqueous suspension S1, and/or the content of the at least one flocculating additive B in the second aqueous suspension S2 is from 0.2 to 0.8 wt.-%, based on the total weight of the second aqueous suspension S2.

19. The process according to claim 1, wherein the content of the at least one first filler material in the first aqueous suspension S1 is from 15 to 65 wt.-%, based on the total weight of the first aqueous suspension S1, and the content of the at least one second filler material in the second aqueous suspension S2 is from 15 to 65 wt.-%, based on the total weight of the second aqueous suspension S2.

20. The process according to claim 1, wherein the content of the at least one first filler material in the first aqueous suspension S1 is from 10 to 40 wt.-%, based on the total weight of the first aqueous suspension S1, and the content of the at least one second filler material in the second aqueous suspension S2 is from 10 to 40 wt.-%, based on the total weight of the second aqueous suspension S2.

21. The process according to claim 1, wherein the mass ratio of the at least one first filler material in the first aqueous suspension and the at least one second filler material in the second aqueous suspension S1:S2 is between 99:1 and 1:99.

22. The process according to claim 1, wherein the mass ratio of the at least one first filler material in the first aqueous suspension and the at least one second filler material in the second aqueous suspension S1:S2 is between 95:15 and 5:85.

23. The process according to claim 1, wherein the mass ratio of the at least one first filler material in the first aqueous suspension and the at least one second filler material in the second aqueous suspension S1:S2 is between 70:30 and 30:70.

24. The process according to claim 1, wherein the aqueous suspension SM has a solids content of from 1 to 75 wt.-%, based on the total weight of the aqueous suspension SM.

25. The process according to claim 1, wherein the aqueous suspension SM has a solids content of from 2 to 60 wt.-%, based on the total weight of the aqueous suspension SM.

26. The process according to claim 1, wherein the aqueous suspension SM has a solids content of from 5 to 35 wt.-%, based on the total weight of the aqueous suspension SM.

27. The process according to claim 1, wherein the aqueous suspension SM of flocculated filler particles has a monomodal particle size distribution.

28. The process according to claim 1, wherein the aqueous suspension SM of flocculated filler particles has a volume defined particle size polydispersity expressed as full width at half maximum height (FWHM) of less than 45 µm.

29. The process according to claim 1, wherein the aqueous suspension SM of flocculated filler particles has a volume defined particle size polydispersity expressed as full width at half maximum height (FWHM) of less than 30 µm.

30. The process according to claim 1, wherein the aqueous suspension SM of flocculated filler particles has a volume defined particle size polydispersity expressed as full width at half maximum height (FWHM) of less than 10 µm.

31. The process according to claim 1, wherein a content of the at least one first filler material in the first aqueous suspension S1 is from 1 to 85 wt.-%, based on a total weight of the first aqueous suspension S1.

32. The process according to claim 1, wherein a content of the at least one second filler material in the second aqueous suspension S2 is from 1 to 85 wt.-%, based on a total weight of the second aqueous suspension S2.

* * * * *